(12) United States Patent
Yoneyama

(10) Patent No.: US 7,457,049 B2
(45) Date of Patent: Nov. 25, 2008

(54) HIGH MAGNIFICATION ZOOM LENS

(75) Inventor: Shuji Yoneyama, Changwon-si (KR)

(73) Assignee: Samsung Techwin Co., Ltd., Changwon (KR)

(*) Notice: Subject to any disclaimer, the term of this patent is extended or adjusted under 35 U.S.C. 154(b) by 0 days.

(21) Appl. No.: 11/895,448

(22) Filed: Aug. 23, 2007

(65) Prior Publication Data

US 2008/0117528 A1 May 22, 2008

(30) Foreign Application Priority Data

Nov. 3, 2006 (KR) .................... 10-2006-0108367

(51) Int. Cl.
*G02B 15/14* (2006.01)
(52) U.S. Cl. .................... 359/687; 359/686
(58) Field of Classification Search ............ 359/684, 359/685, 686, 687
See application file for complete search history.

(56) References Cited

U.S. PATENT DOCUMENTS

| | | | | |
|---|---|---|---|---|
| 4,657,351 | A * | 4/1987 | Mori | 359/687 |
| 5,032,013 | A * | 7/1991 | Shibayama | 359/684 |
| 6,353,505 | B1 * | 3/2002 | Yoneyama | 359/687 |
| 7,253,965 | B2 * | 8/2007 | Shibayama et al. | 359/687 |
| 7,256,946 | B2 * | 8/2007 | Yoneyama | 359/686 |
| 7,342,730 | B2 * | 3/2008 | Yoneyama | 359/763 |

FOREIGN PATENT DOCUMENTS

JP 2003-241097 A 8/2003

* cited by examiner

*Primary Examiner*—David N Spector
(74) *Attorney, Agent, or Firm*—Drinker Biddle & Reath LLP

(57) ABSTRACT

A high magnification zoom lens system includes a first lens group having positive refractive power, a second lens group having negative refractive power, a third lens group having positive refractive power, and a fourth lens group having positive refractive power, which are arranged in order from an object side. The third lens group includes three lens elements respectively having positive, positive, and negative refractive powers in order from the object side. The fourth lens group includes at least two positive lens elements and a doublet lens having positive refractive power as a whole, each lens group moves independently during magnification change. The high magnification zoom lens system satisfies the conditions that $$0.40 < \frac{f_w}{f_{bw}} < 0.55 \text{ and } 0.35 < \frac{\beta_{3,4W}}{\beta_{3,4T}} < 0.43,$$

where $f_w$ is the focal length of the overall lens system at a wide-angle end, $f_{bw}$ is the back focal length of the lens system at the wide-angle position, $\beta_{3,4w}$ is the combined magnification ratio of the third and fourth lens groups at the wide-angle position, and $\beta_{3,4T}$ is the combined magnification ratio of the third and fourth lens groups at the telephoto position.

14 Claims, 33 Drawing Sheets

(A) LONGITUDINAL SPHERICAL ABERRATION
(B) ASTIGMATIC FIELD CURVATURE
(C) DISTORTION

LATERAL CHROMATIC ABERRATION (A) LONGITUDINAL SPHERICAL ABERRATION (B) ASTIGMATIC FIELD CURVATURE (C) DISTORTION

LATERAL CHROMATIC ABERRATION (A) (B) (C)

HIGH MAGNIFICATION ZOOM LENS

CROSS-REFERENCE TO RELATED PATENT APPLICATIONS

This application claims the benefit of Korean Patent Application No. 10-2006-0108367, filed on Nov. 3, 2006, in the Korean Intellectual Property Office, the disclosure of which is incorporated herein in its entirety by reference.

BACKGROUND OF THE INVENTION

1. Field of the Invention

The present invention relates to a compact and thin high magnification zoom lens.

2. Description of the Related Art

Digital still cameras (DSCs) are widely used as a photographing device. Some DSCs use, a three-group zoom lens of negative-positive-positive refractive powers having a half viewing angle at a wide angle position of 29 to 32 degrees and a magnification of 3×. The three-group zoom lens is widely used because the diameter or entire length of a lens can be miniaturized. In contrast, a typical silver halide single lens reflex uses 35 mm film and has a photographing lens which is changeable but results in a relatively large photographing device to accommodate changing lenses that are separately available in the market. However, a photographing device having a size smaller than 35 mm is in demand. In this case, since the viewing angle is narrow, an exchange lens having a short focal length is needed. Changing lenses, however, introduces the risk of dust or other debris entering the camera and damaging it or degrading performance. Thus, a high magnification zoom lens capable of photographing without changing lenses is desired.

FIG. 1 illustrates a four-group type zoom lens disclosed in Japanese Laid-open Patent Publication No. 2003-241,097. Referring to FIG. 1, the zoom lens includes a first lens group G1 having positive refractive power, a second lens group G2 having negative refractive power, a third lens group G3 having positive refractive power, and a fourth lens group G4 having positive refractive power, in order from the object side. When the magnification changes from the wide-angle position to the telephoto position, the distance between the first and second lens groups decreases and the distance between the first, third, and fourth lens groups decrease. Also, the first, third, and fourth lens groups move toward the object. Focusing is performed by movement of only the second lens group. Reference numerals in FIG. 1 show surface numbers of each lens. Although the zoom lens has a high magnification of about 10 times, the viewing angle is too narrow.

SUMMARY OF THE INVENTION

To solve the above and/or other problems, the present invention provides a zoom lens having a short focal length and provides both a wide angle viewing and high magnification.

According to an aspect of the present invention, a high magnification zoom lens includes a first lens group having positive refractive power, a second lens group having negative refractive power, a third lens group having positive refractive power, and a fourth lens group having positive refractive power, which are arranged respectively in order from an object side, wherein the third lens group comprises three lens elements respectively having positive, positive, and negative refractive powers in order from the object side, the fourth lens group comprises at least two positive lens elements and a doublet lens having positive refractive power as a whole, each lens group moves independently during magnification change, and the high magnification zoom lens satisfies the conditions that $$0.40 < \frac{f_w}{f_{bw}} < 0.55 \text{ and}$$

$$0.35 < \frac{\beta_{3,4W}}{\beta_{3,4T}} < 0.43,$$

where $f_w$ is a focal length of an overall lens system at a wide-angle end, $f_{bw}$ is a back focal length of a lens system at the wide-angle end, $\beta_{3,4w}$ is a combined magnification ratio of the third and fourth lens groups at the wide-angle end, and $\beta_{3,4T}$ is a combined magnification ratio of the third and fourth lens groups at a telephoto end.

According to another aspect of the present invention, a high magnification zoom lens includes a first lens group having positive refractive power, a second lens group having negative refractive power, a third lens group having positive refractive power, and a fourth lens group having positive refractive power, which are arranged in order from an object side, wherein the third lens group comprises three lens elements respectively having positive, positive, and negative refractive powers in order from the object side, each lens group moves independently during magnification change, and the high magnification zoom lens satisfies the conditions that $$0.40 < \frac{f_w}{f_{bw}} < 0.55, \ 0.35 < \frac{\beta_{3,4W}}{\beta_{3,4T}} < 0.43, \text{ and } 9 < \frac{f_T}{f_w} < 12,$$

where $f_w$ is a focal length of an overall lens system at a wide-angle end, $f_{bw}$ is a back focal length of a lens system at the wide-angle end, $\beta_{3,4w}$ is a combined magnification ratio of the third and fourth lens groups at the wide-angle end, $\beta_{3,4T}$ is a combined magnification ratio of the third and fourth lens groups at a telephoto end, and $f_T$ is a focal length of the overall lens system at the telephoto end.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Referring to FIGS. 2A, 2B, and 2C, the high magnification zoom lens includes a first lens group Gr1, a second lens group Gr2, a third lens group Gr3, and a fourth lens group Gr4 which are arranged respectively in order from the object side. During magnification change, the first through fourth lens groups Gr1 through Gr4 move independently.

The first lens group Gr1 has positive refractive power, the second lens group Gr2 has negative refractive power, the third lens group Gr3 has positive refractive power, and the fourth lens group Gr4 has positive refractive power. The second, third, and fourth lens groups Gr2, Gr3, and Gr4 each have at least one aspherical surface.

Figure 1:
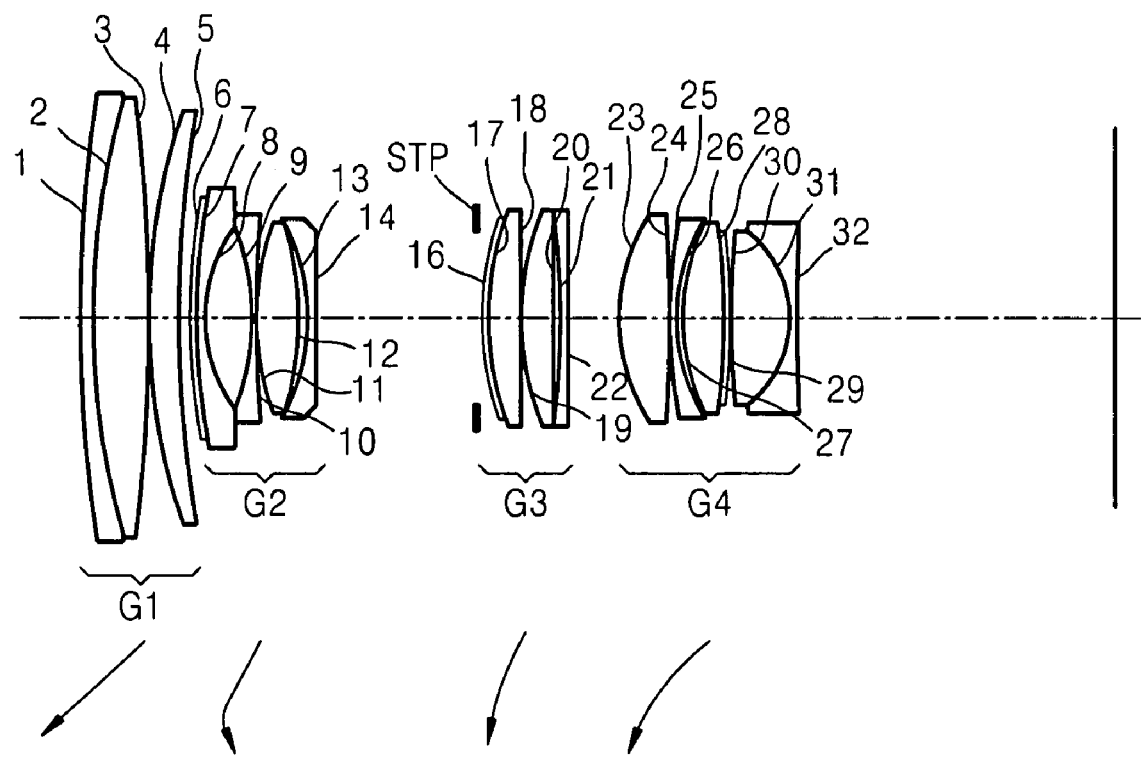
FIG. 1 illustrates the lens system and magnification change of the zoom lens disclosed in Japanese Laid-open Patent Publication No. 2003-241,097.
Figure 2:
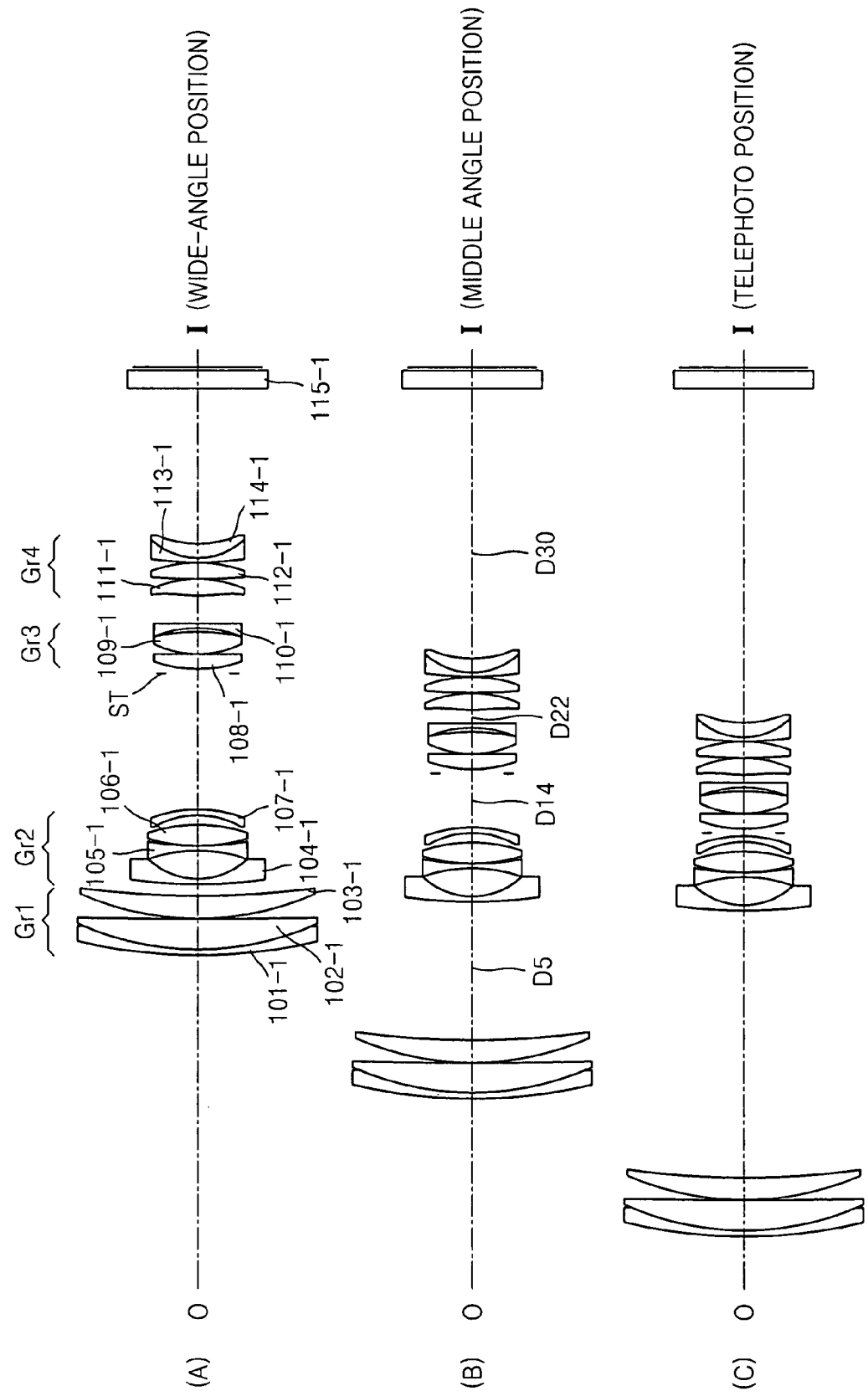
FIGS. 2A, 2B, and 2C respectively illustrate the configurations at a wide-angle position, a middle angle position, and a telephoto position of a high magnification zoom lens according to an embodiment of the present invention.
Figure 3:
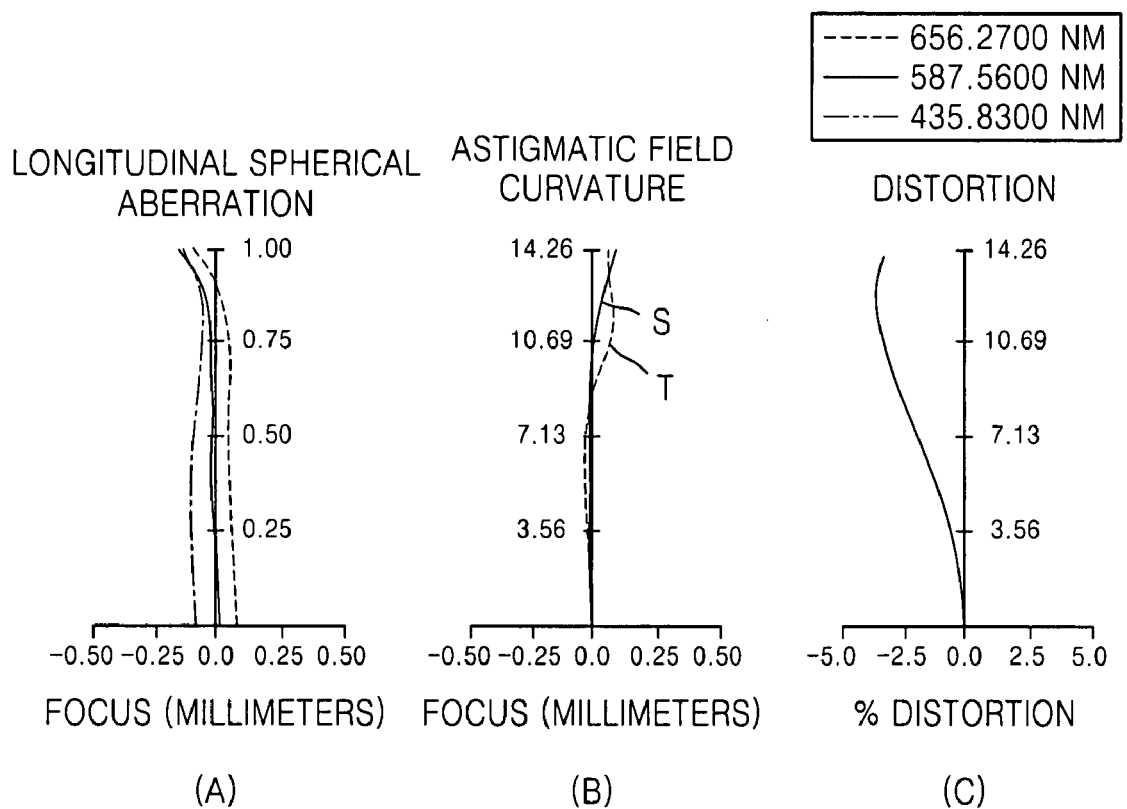
FIGS. 3A, 3B, and 3C respectively illustrate the spherical aberration, astigmatic field curvature, and distortion at the wide-angle end of the high magnification zoom lens of FIGS. 2A, 2B, and 2C.
Figure 4:
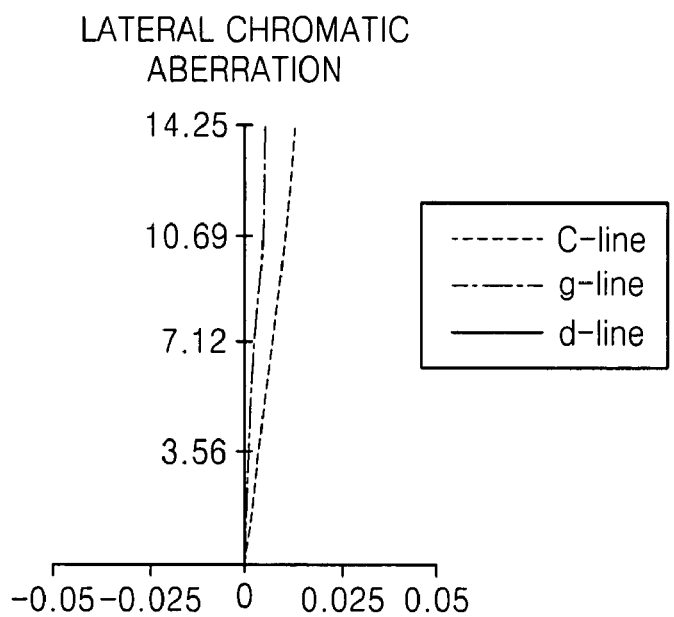
FIG. 4 illustrates the lateral color at the wide-angle end of the high magnification zoom lens of FIGS. 2A, 2B, and 2C.
Figure 5:
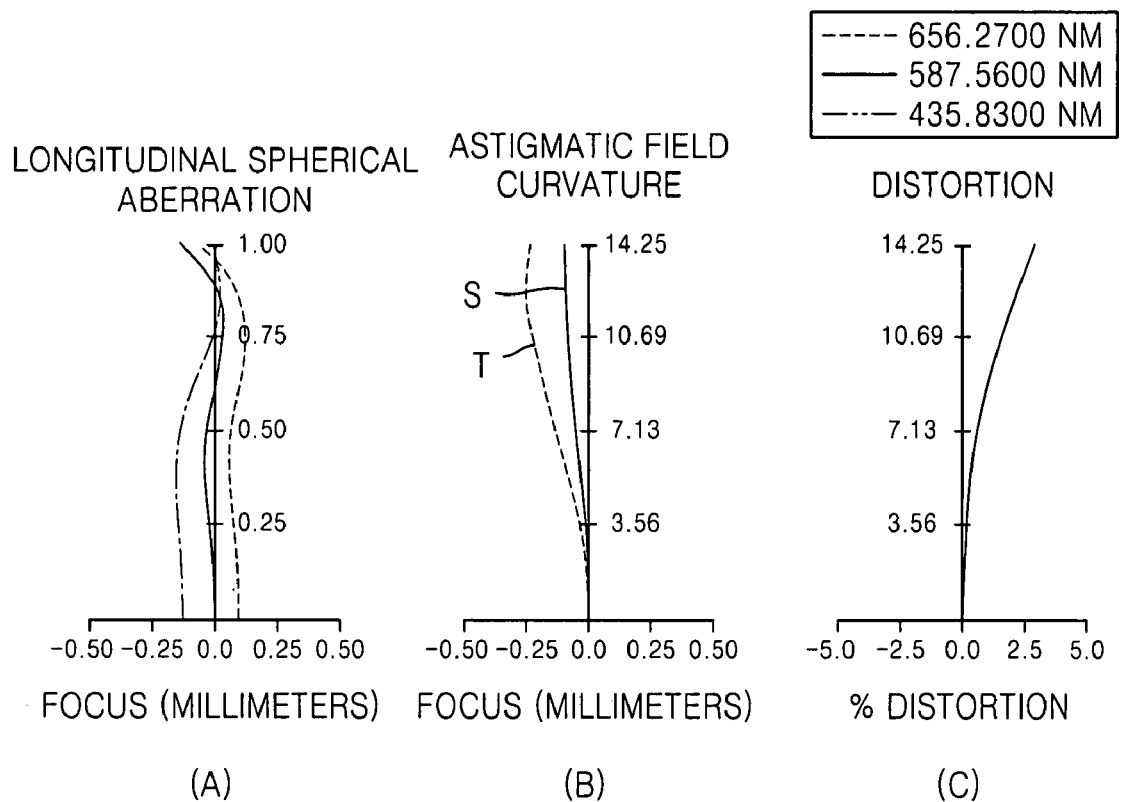
FIGS. 5A, 5B, and 5C respectively illustrate the spherical aberration, astigmatic field curvature, and distortion at the middle end of the high magnification zoom lens of FIGS. 2A, 2B, and 2C.
Figure 6:
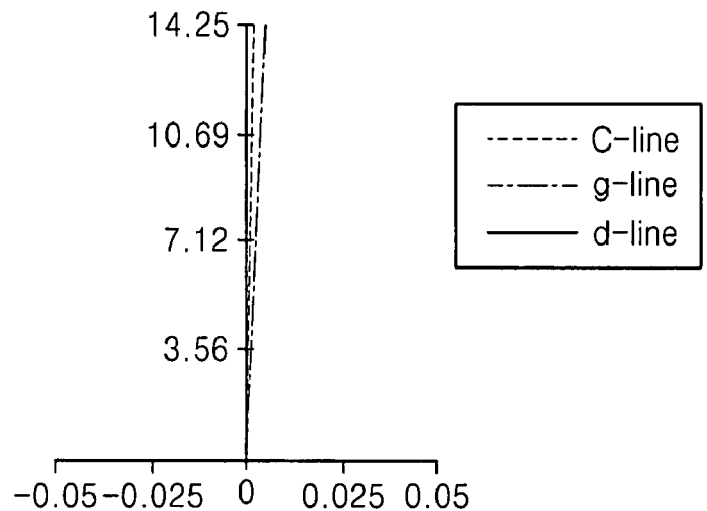
FIG. 6 illustrates the lateral color at the middle end of the high magnification zoom lens of FIGS. 2A, 2B, and 2C.
Figure 7:
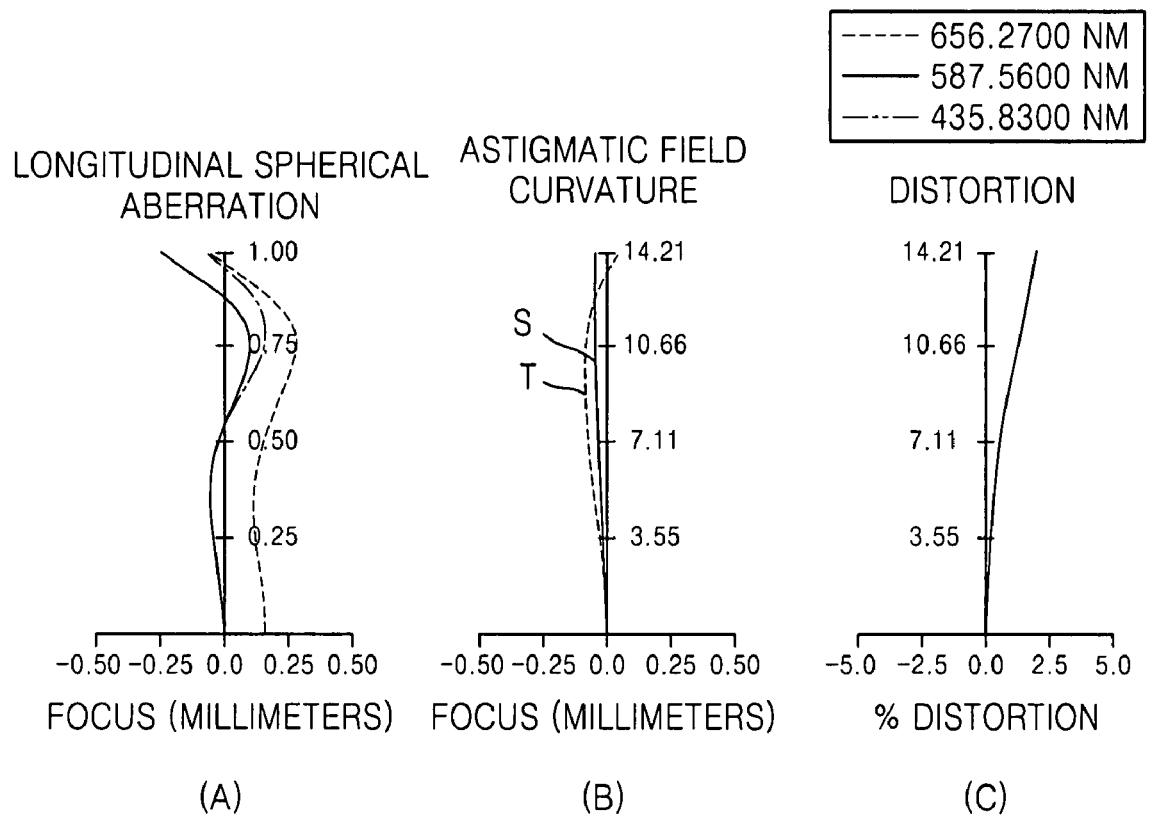
FIGS. 7A, 7B, and 7C respectively illustrate the spherical aberration, astigmatic field curvature, and distortion at the telephoto end of the high magnification zoom lens of FIGS. 2A, 2B, and 2C.
Figure 8:
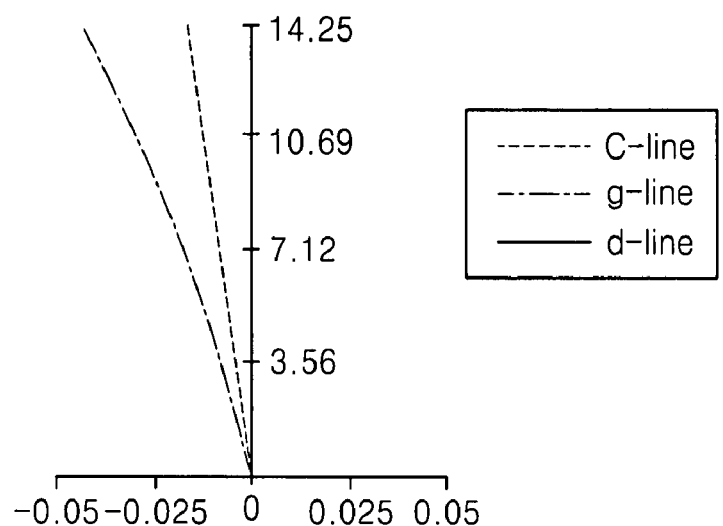
FIG. 8 illustrates the lateral color at the telephoto end of the high magnification zoom lens of FIGS. 2A, 2B, and 2C.
Figure 9:
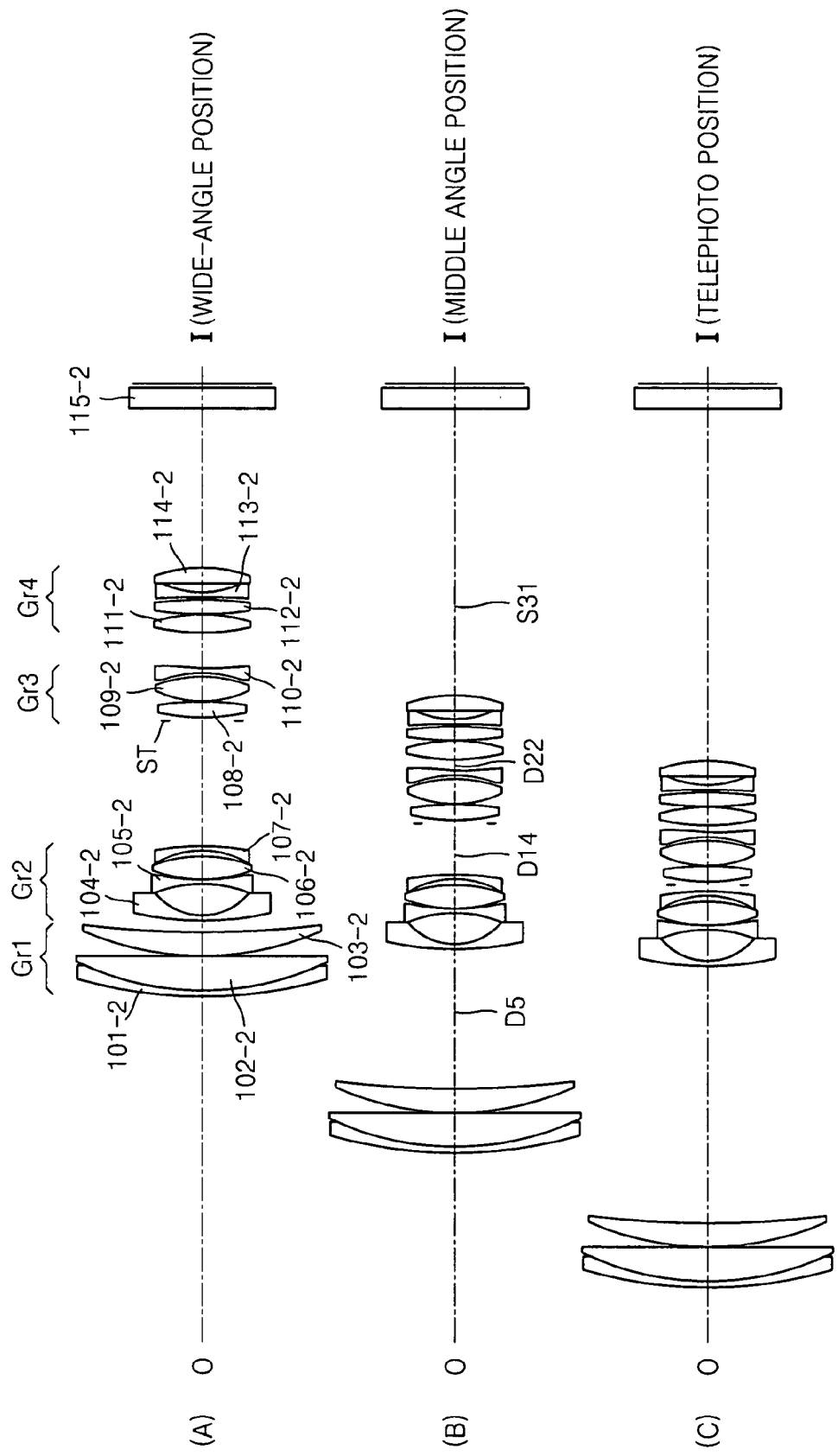
FIGS. 9A, 9B, and 9C respectively illustrate the configurations at a wide-angle position, a middle angle, and a telephoto position of a high magnification zoom lens according to another embodiment of the present invention.
Figure 10:
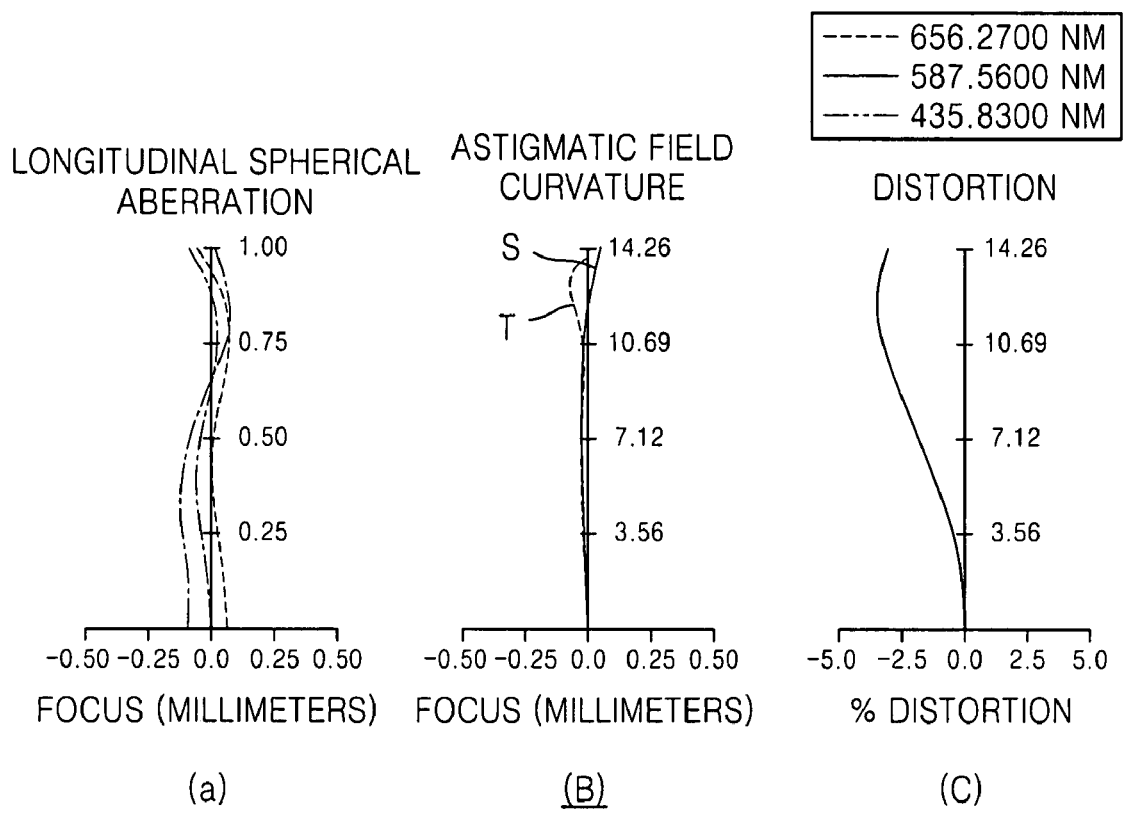
FIGS. 10A, 10B, and 10C respectively illustrate the spherical aberration, astigmatic field curvature, and distortion at the wide-angle position of the high magnification zoom lens of FIGS. 9A, 9B, and 9C.
Figure 11:
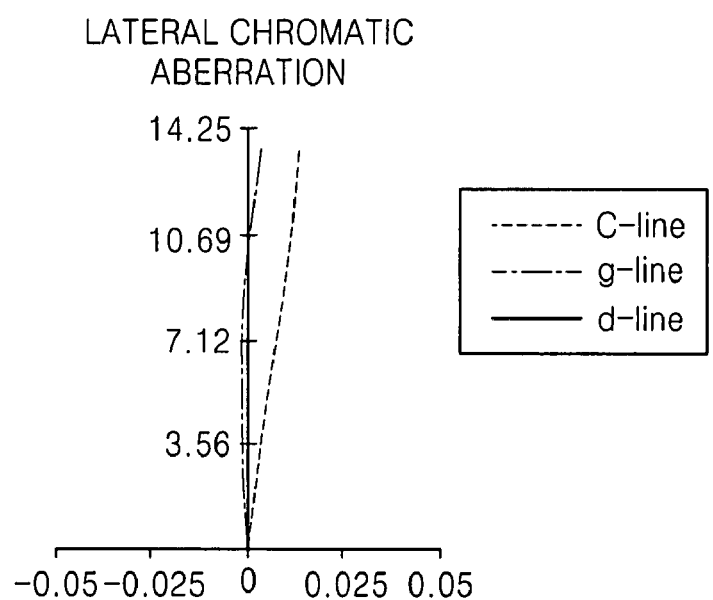
FIG. 11 illustrates the lateral color at the wide-angle position of the high magnification zoom lens of FIGS. 9A, 9B, and 9C.
Figure 12:
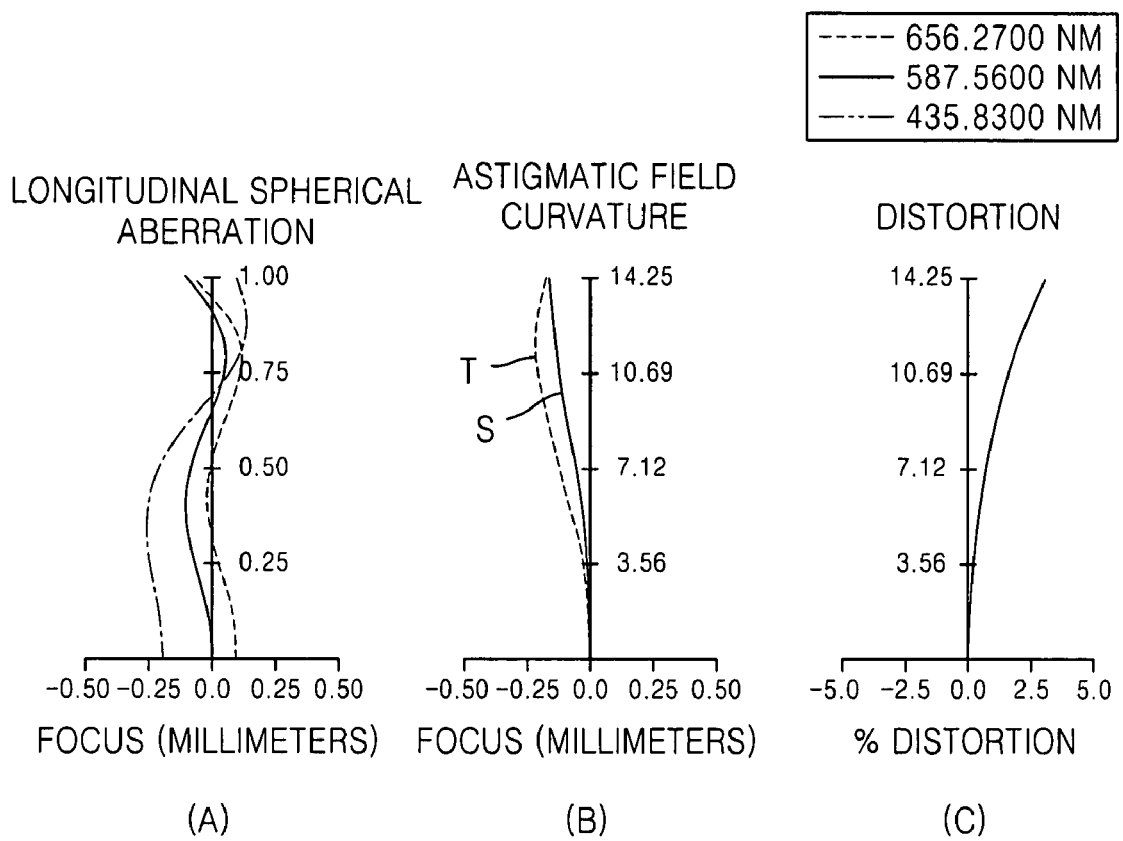
FIGS. 12A, 12B, and 12C respectively illustrate the spherical aberration, astigmatic field curvature, and distortion at the middle angle position of the high magnification zoom lens of FIGS. 9A, 9B, and 9C.
Figure 13:
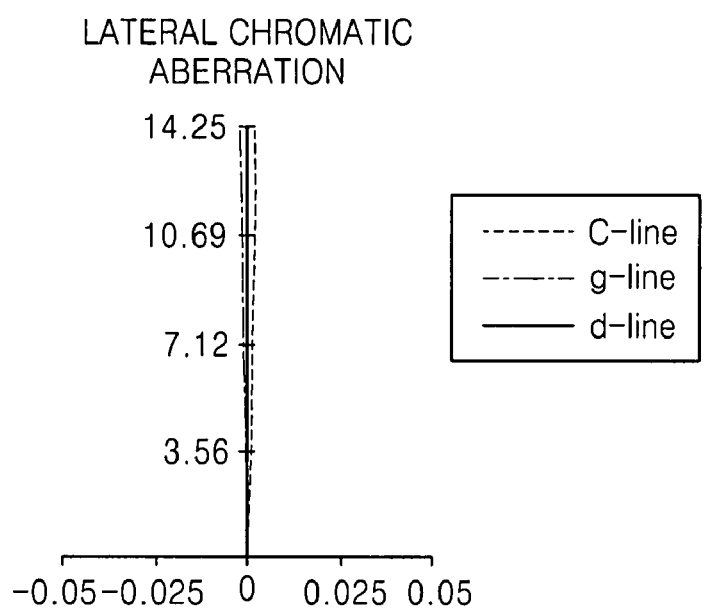
FIG. 13 illustrates the lateral color at the middle angle position of the high magnification zoom lens of FIGS. 9A, 9B, and 9C.
Figure 14:
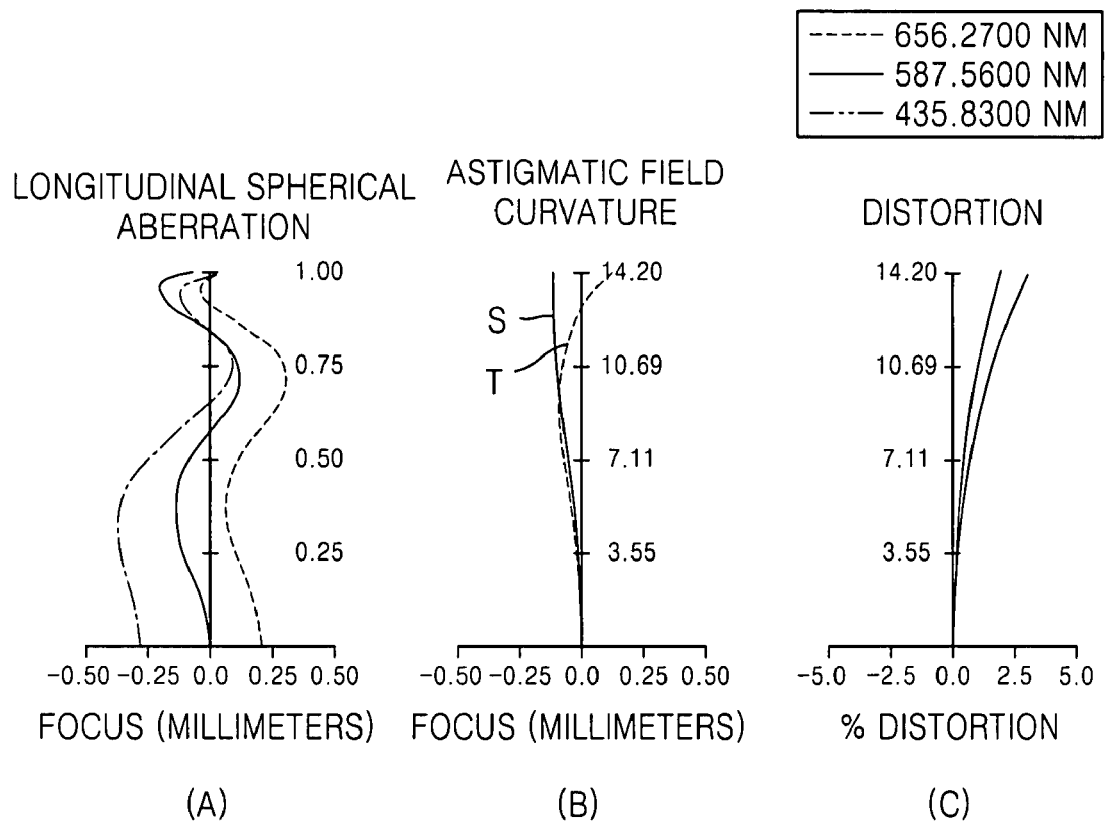
FIGS. 14A, 14B, and 14C respectively illustrate the spherical aberration, astigmatic field curvature, and distortion at the telephoto position of the high magnification zoom lens of FIGS. 9A, 9B, and 9C.
Figure 15:
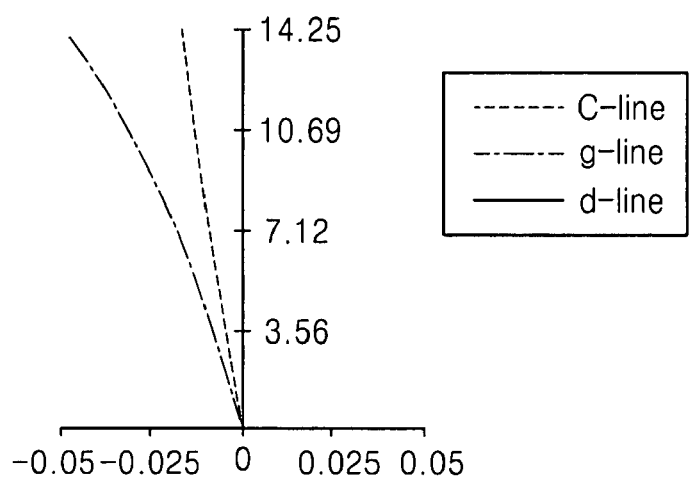
FIG. 15 illustrates the lateral color at the telephoto position of the high magnification zoom lens of FIGS. 9A, 9B, and 9C.

The first lens group Gr1 includes, for example, first, second, and third lens elements 101-1, 102-1, and 103-1. The second lens group Gr2 includes fourth, fifth, sixth, and seventh lens elements 104-1, 105-1, 106-1, and 107-1. The fourth lens element 104-1 that is the first lens element of the second lens group Gr2 from the object side may have an aspherical surface. In FIG. 2, an aspherical surface is provided at the first lens element of the second lens group Gr2 from the object side. The lens element having the aspherical surface may be formed of a hybrid lens. The hybrid lens is an aspherical lens having an aspherical surface formed by coating at least one glass lens with resin.

The third lens group Gr3 includes three lens elements, for example, an eighth lens element 108-1 having positive refractive power, a ninth lens element 109-1 having positive refractive power, and a tenth lens element 110-1 having negative refractive power which are arranged respectively in order from the object side. The first lens element of the third lens group Gr3 from the object side, that is, the eighth lens element 108-1, may have an aspherical surface. The aspherical surface may be formed of a hybrid lens. An aperture stop ST is provided between the second lens group Gr2 and the third lens group Gr3 and is moved together with the third lens group Gr3.

Figure 16:
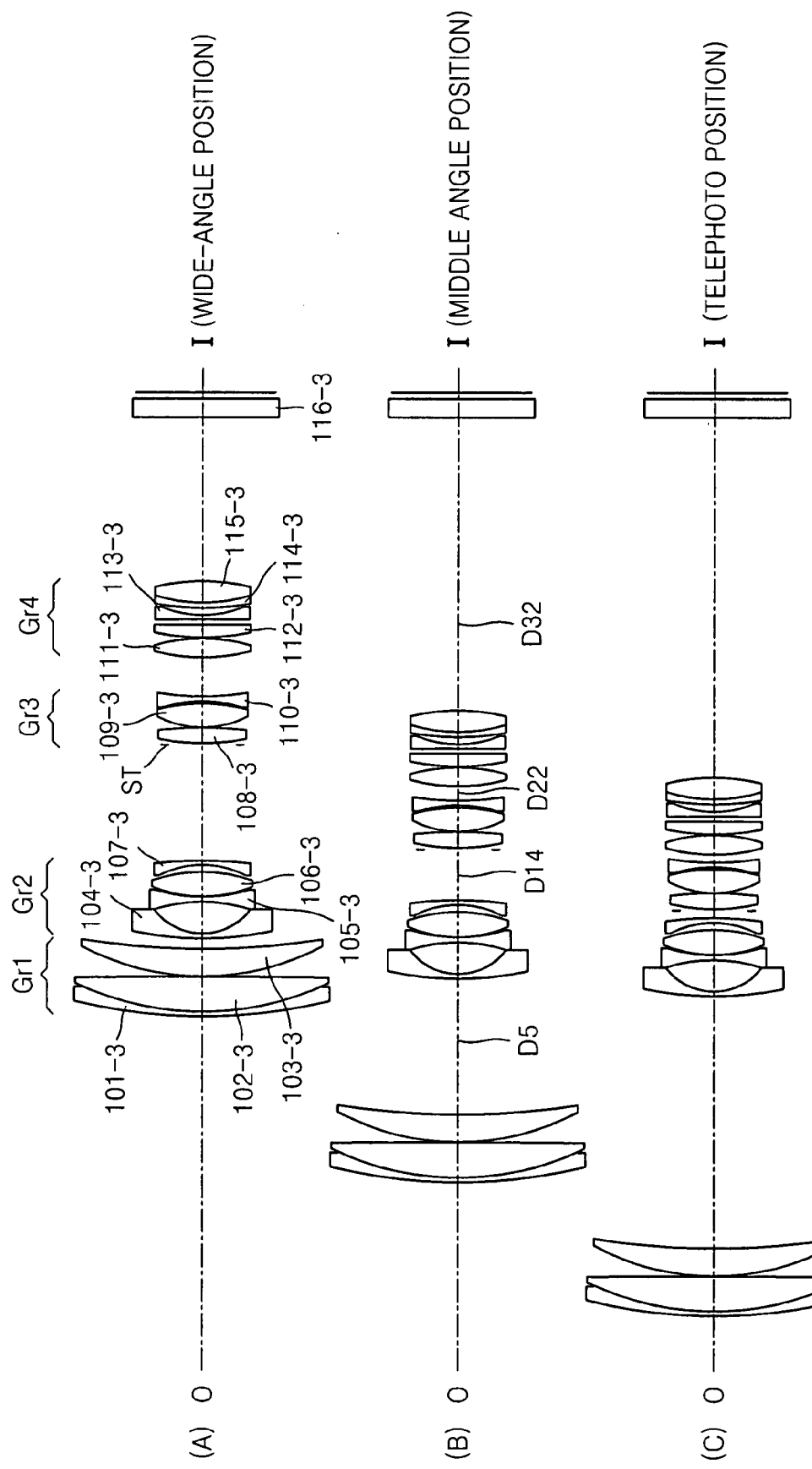
FIGS. 16A, 16B, and 16C respectively illustrate the configurations at a wide-angle position, a middle angle position, and a telephoto position of a high magnification zoom lens according to yet another embodiment of the present invention.
Figure 17:
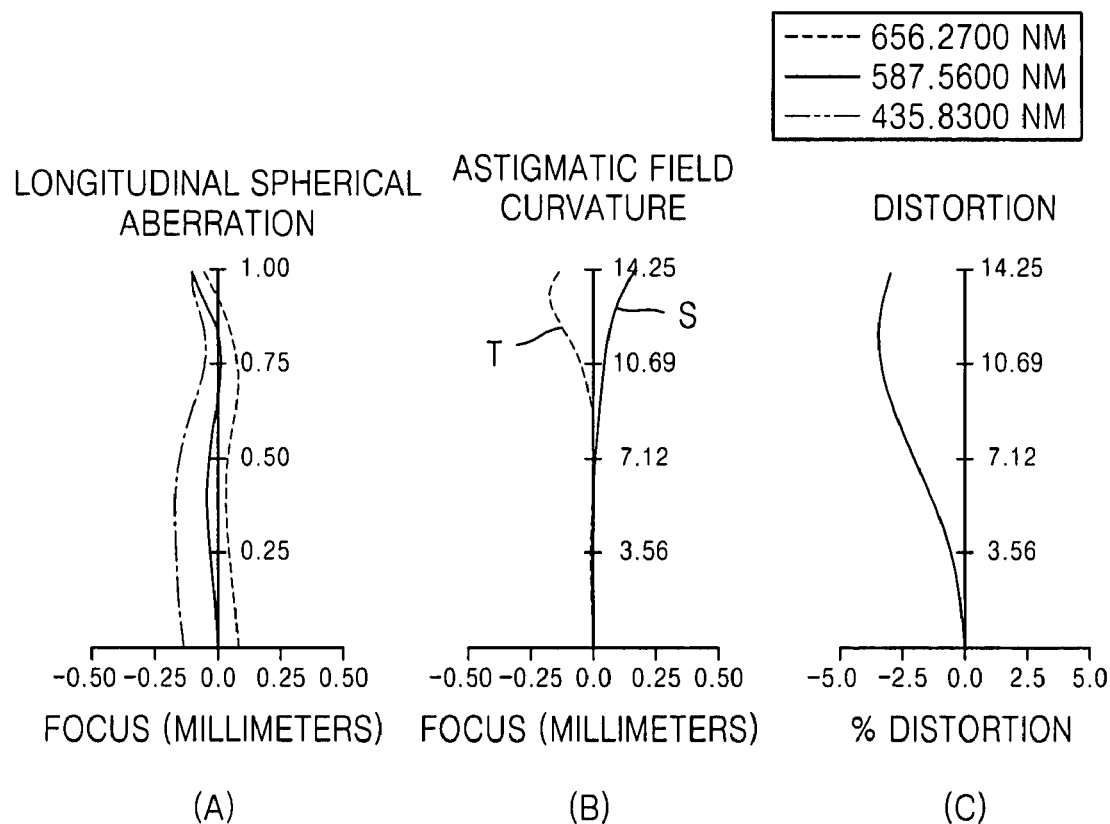
FIGS. 17A, 17B, and 17C respectively illustrate the spherical aberration, astigmatic field curvature, and distortion at the wide-angle position of the high magnification zoom lens of FIGS. 16A, 16B, and 16C.
Figure 18:
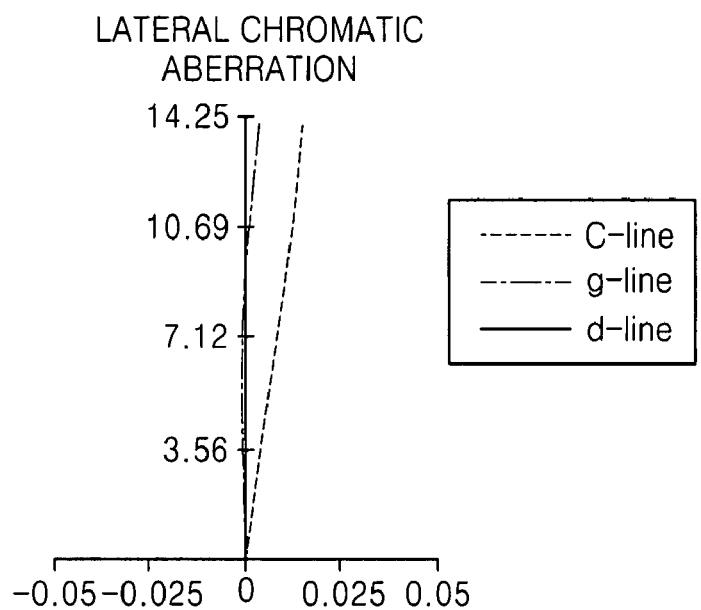
FIG. 18 illustrates the lateral color at the wide-angle position of the high magnification zoom lens of FIGS. 16A, 16B, and 16C.
Figure 19:
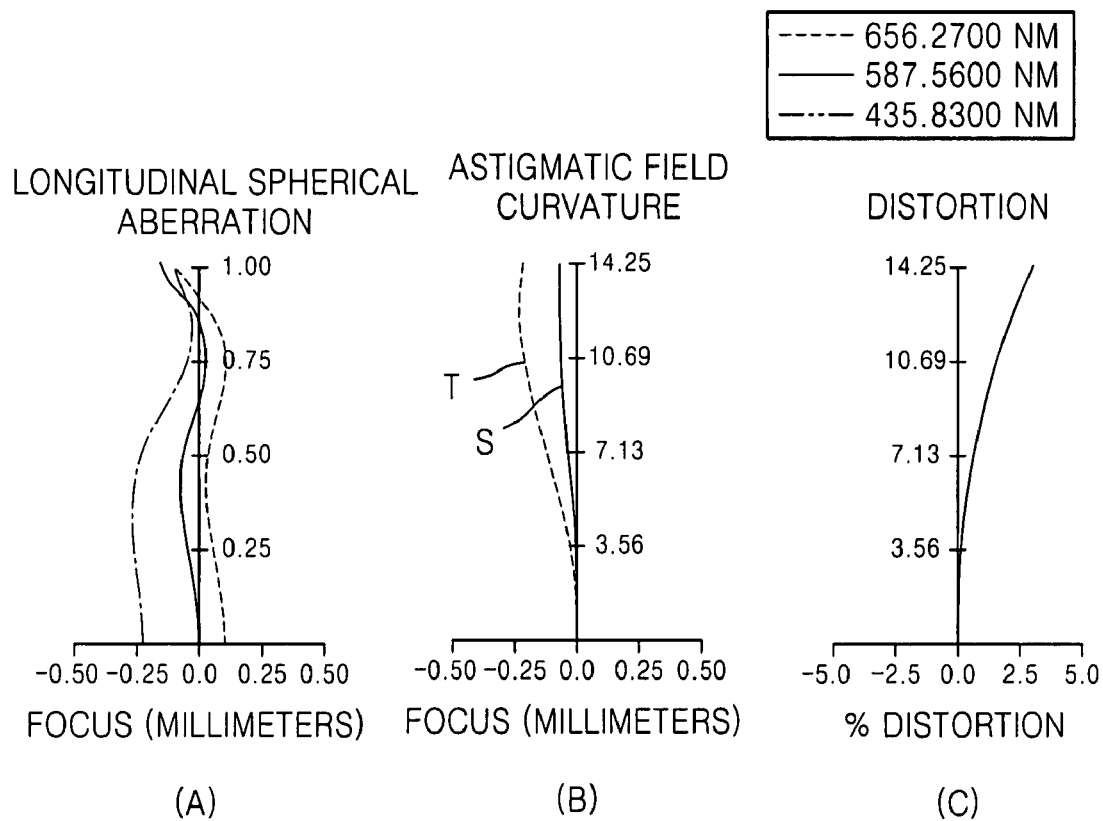
FIGS. 19A, 19B, and 19C respectively illustrate the spherical aberration, astigmatic field curvature, and distortion at the middle angle position of the high magnification zoom lens of FIGS. 16A, 16B, and 16C.
Figure 20:
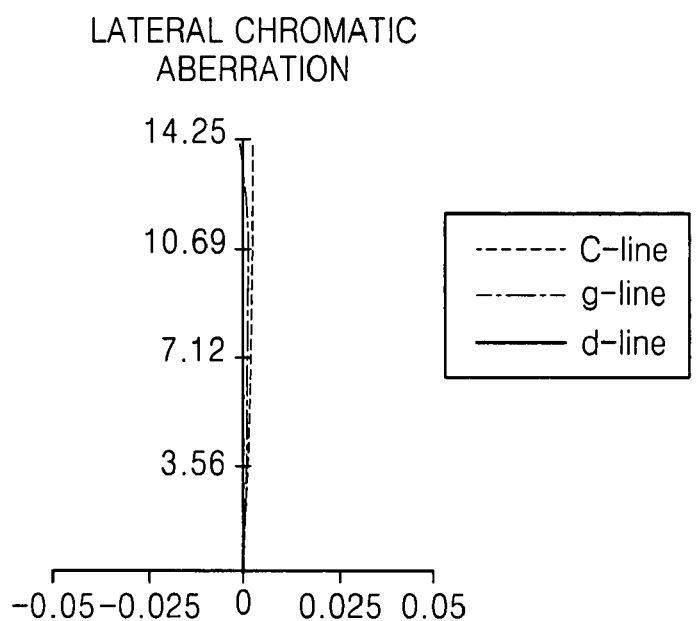
FIG. 20 illustrates the lateral color at the middle angle position of the high magnification zoom lens of FIGS. 16A, 16B, and 16C.
Figure 21:
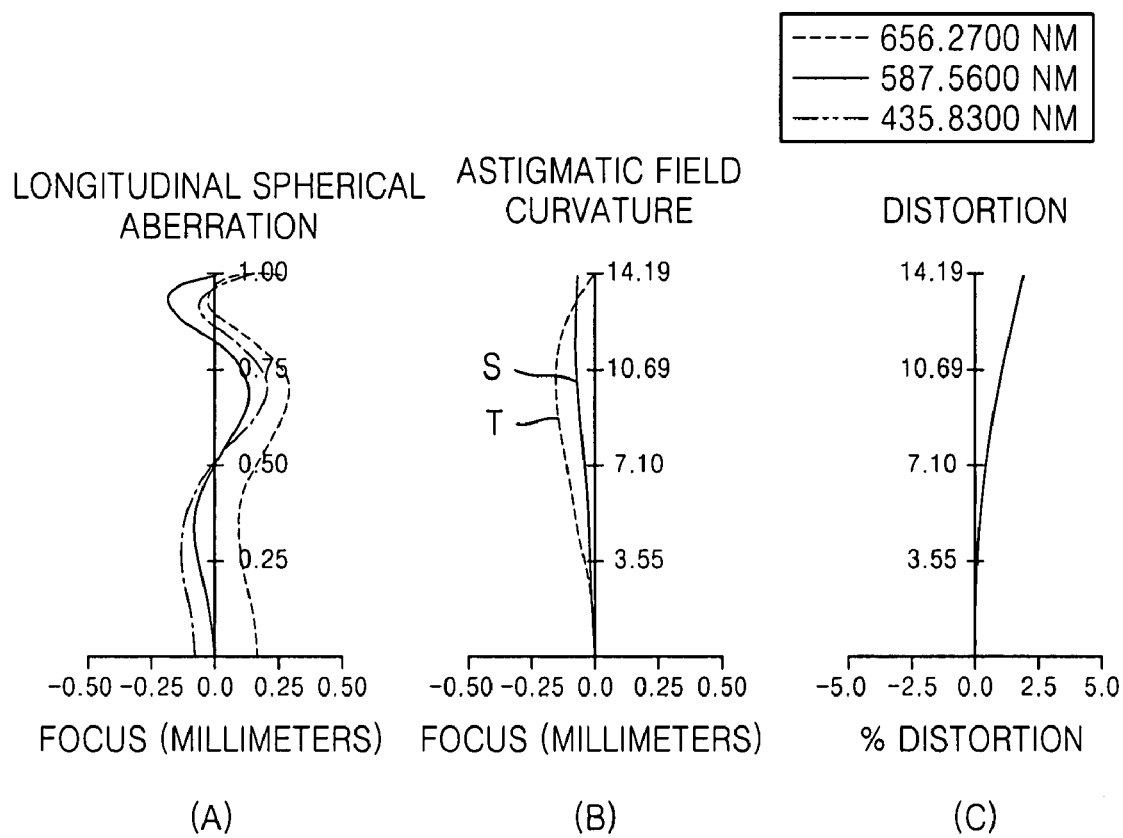
FIGS. 21A, 21B, and 21C respectively illustrate the spherical aberration, astigmatic field curvature, and distortion at the telephoto position of the high magnification zoom lens of FIGS. 16A, 16B, and 16C.
Figure 22:
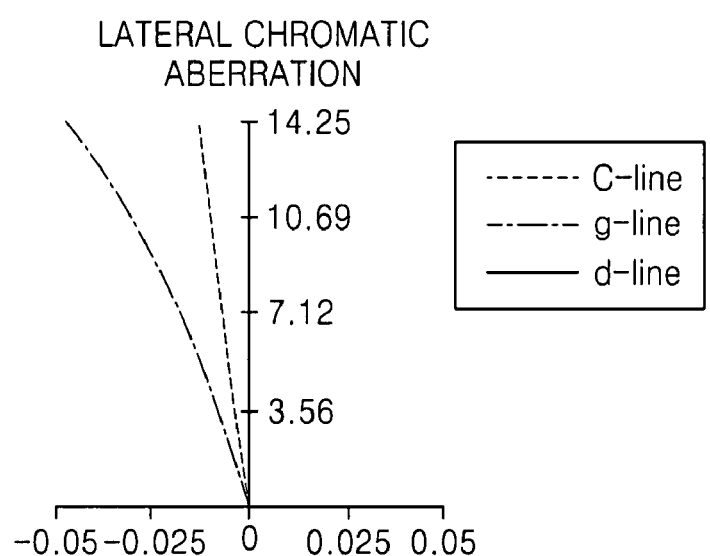
FIG. 22 illustrates the lateral color at the telephoto position of the high magnification zoom lens of FIGS. 16A, 16B, and 16C.
Figure 23:
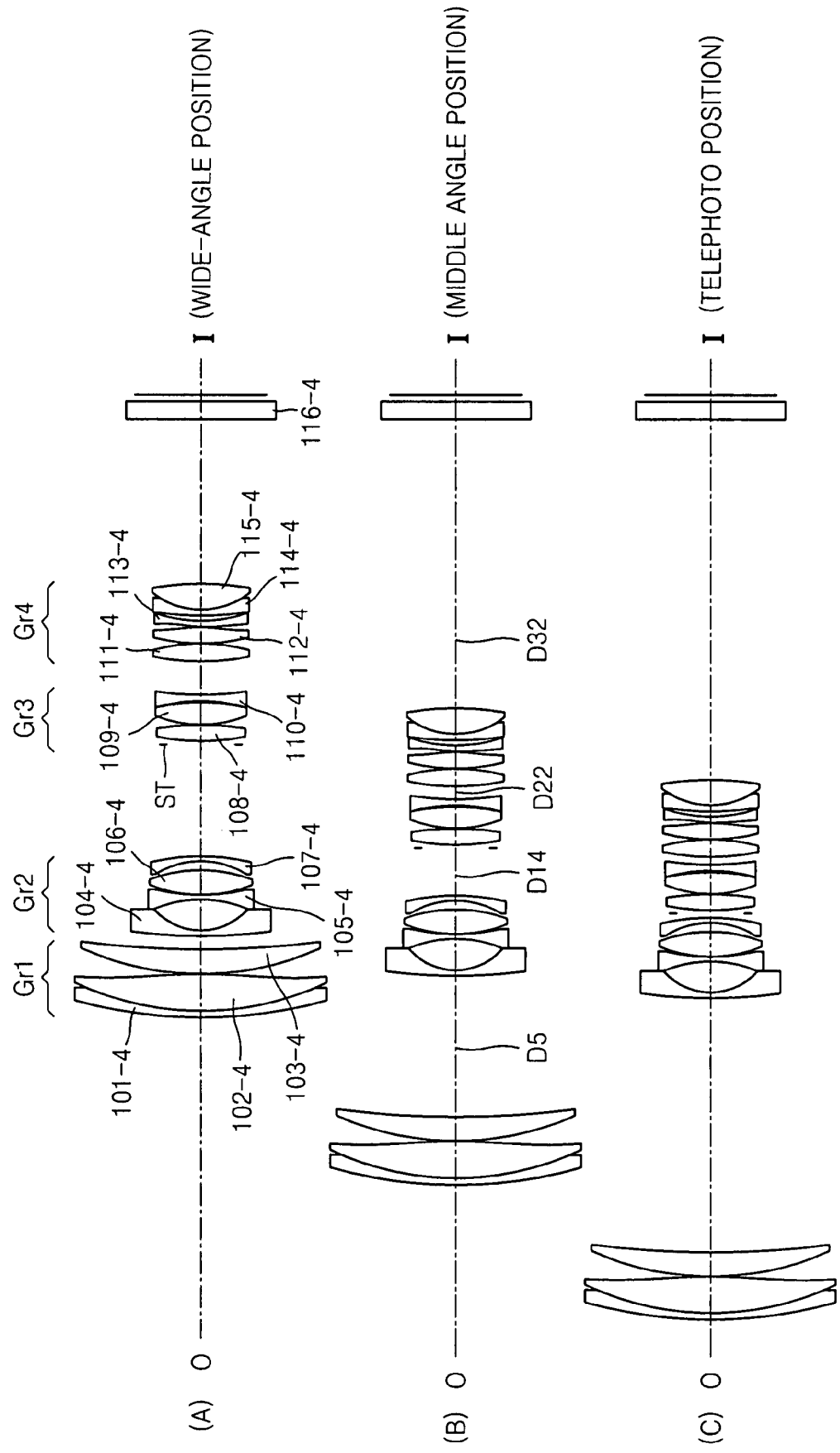
FIGS. 23A, 23B, and 23C respectively illustrate the configurations at a wide-angle position, a middle angle position, and a telephoto position of a high magnification zoom lens according to another embodiment of the present invention.
Figure 24:
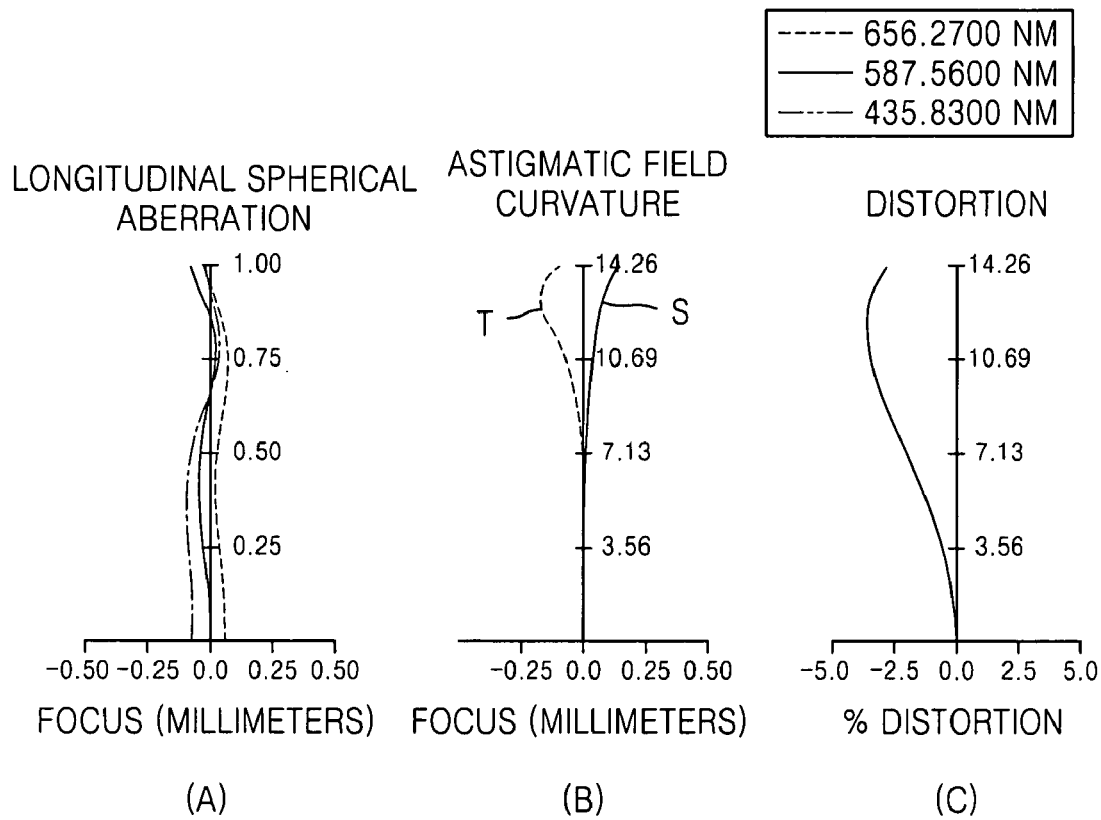
FIGS. 24A, 24B, and 24C respectively illustrate the spherical aberration, astigmatic field curvature, and distortion at the wide-angle position of the high magnification zoom lens of FIGS. 23A, 23B, and 23C.
Figure 25:
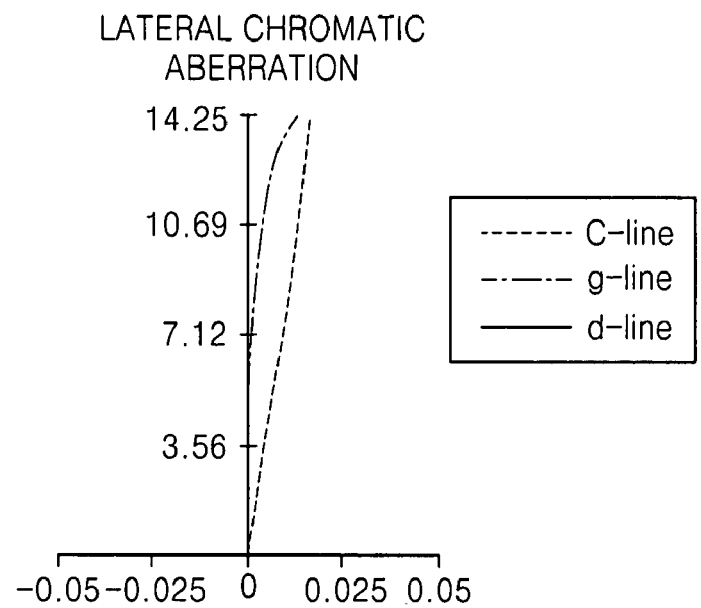
FIG. 25 illustrates the lateral color at the wide-angle position of the high magnification zoom lens of FIGS. 23A, 23B, and 23C.
Figure 26:
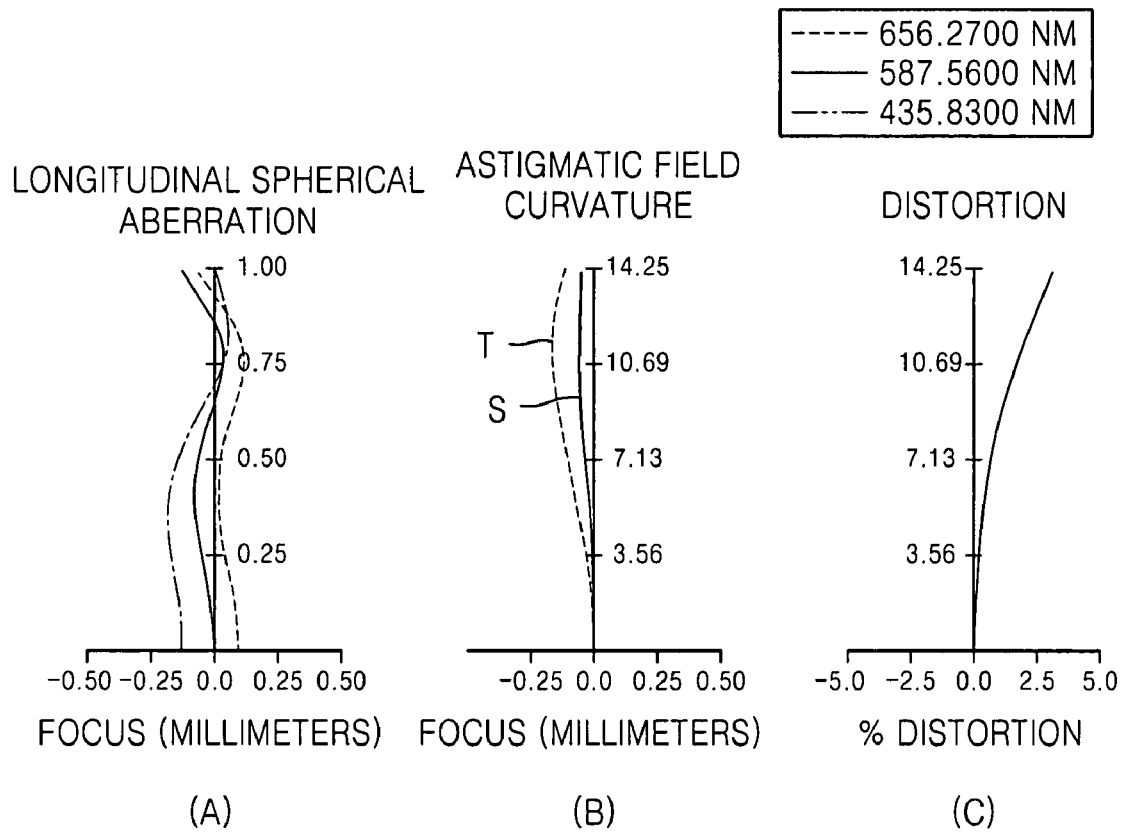
FIGS. 26A, 26B, and 26C respectively illustrate the spherical aberration, astigmatic field curvature, and distortion at the middle angle position end of the high magnification zoom lens of FIGS. 23A, 23B, and 23C.
Figure 27:
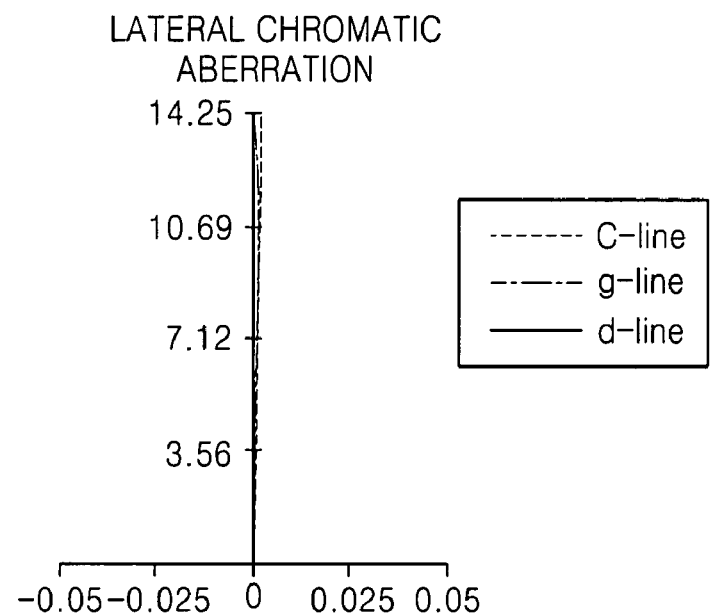
FIG. 27 illustrates the lateral color at the middle angle position of the high magnification zoom lens of FIGS. 23A, 23B, and 23C.
Figure 28:
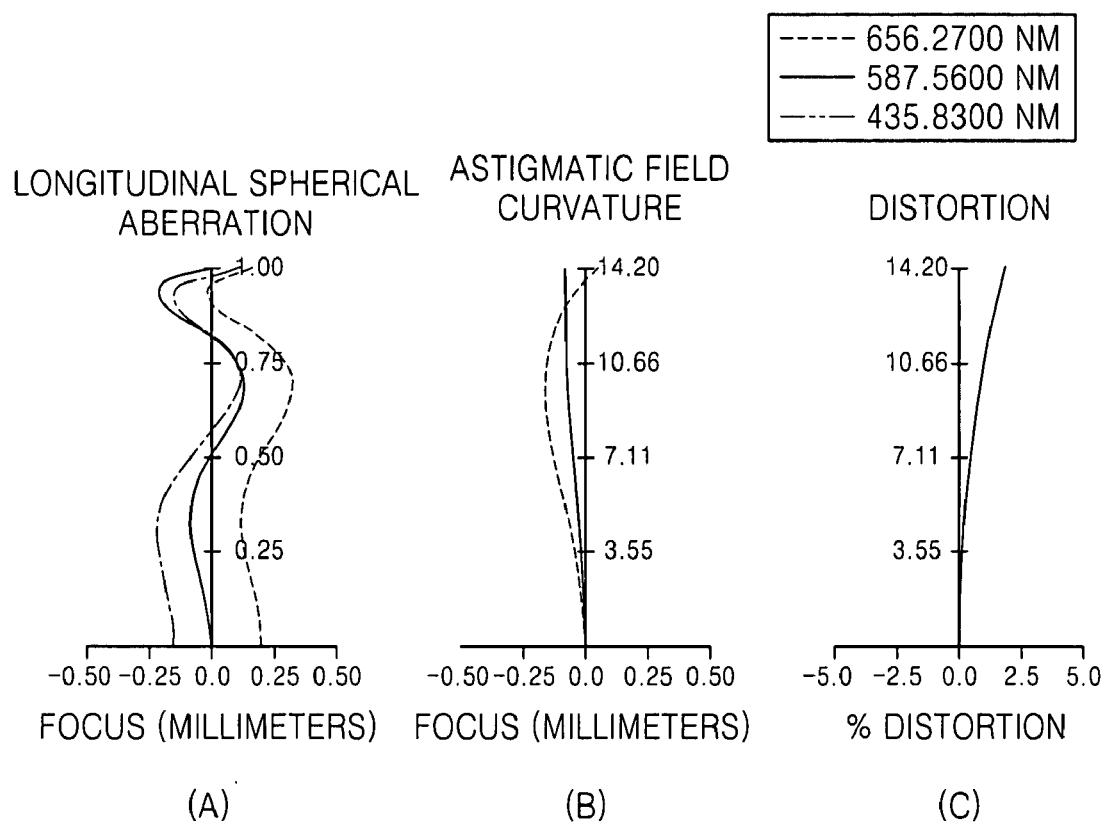
FIGS. 28A, 28B, and 28C respectively illustrate the spherical aberration, astigmatic field curvature, and distortion at the telephoto position of the high magnification zoom lens of FIGS. 23A, 23B, and 23C.
Figure 29:
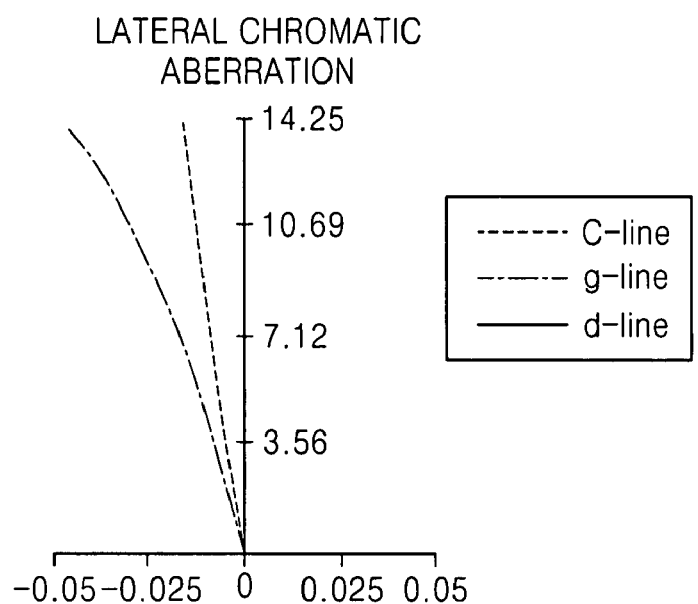
FIG. 29 illustrates the lateral color at the telephoto position of the high magnification zoom lens of FIGS. 23A, 23B, and 23C.
Figure 30:
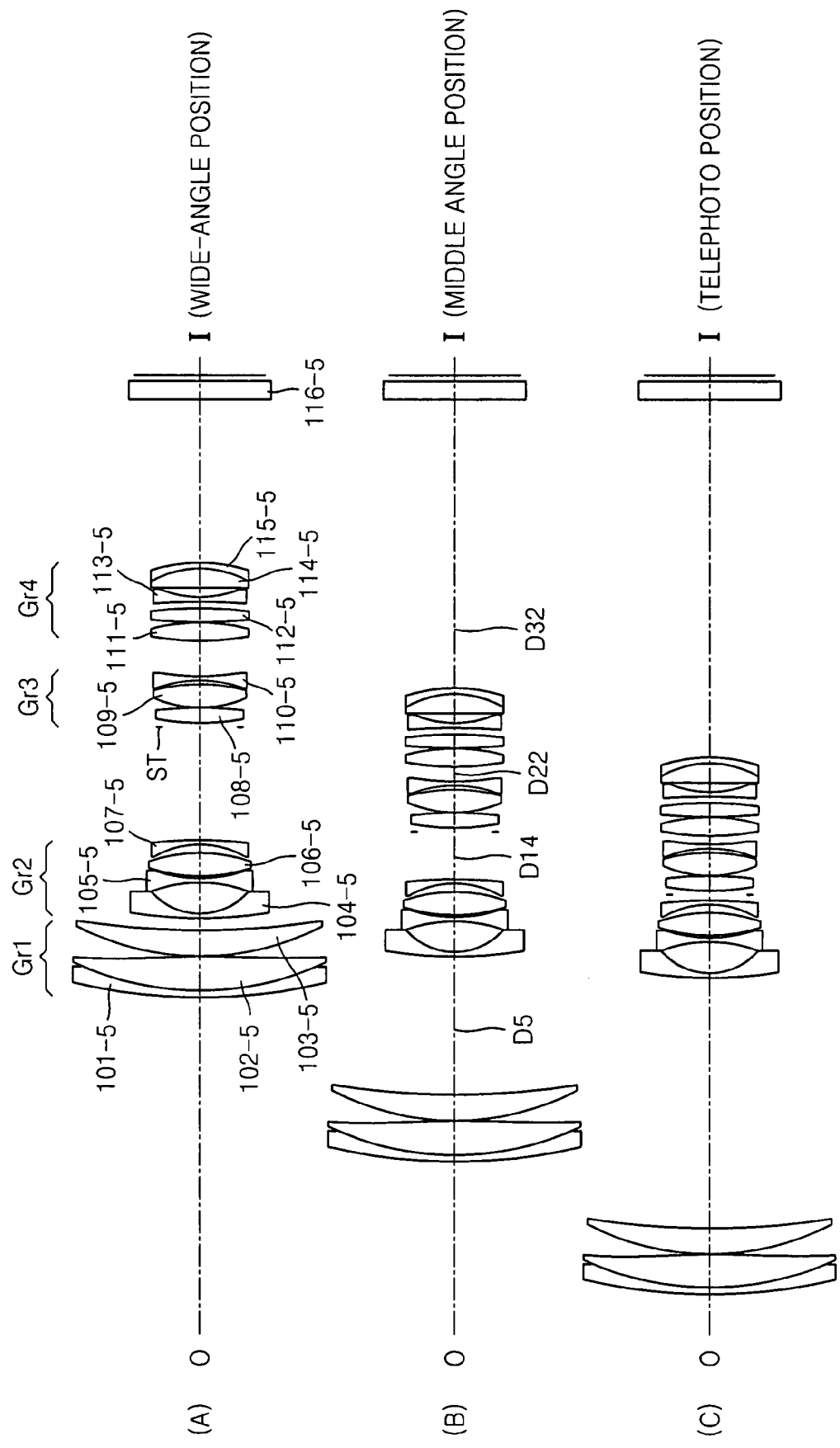
FIGS. 30A, 30B, and 30C respectively illustrate the configurations at a wide-angle position, a middle angle position, and a telephoto position of a high magnification zoom lens according to another embodiment of the present invention.
Figure 31:
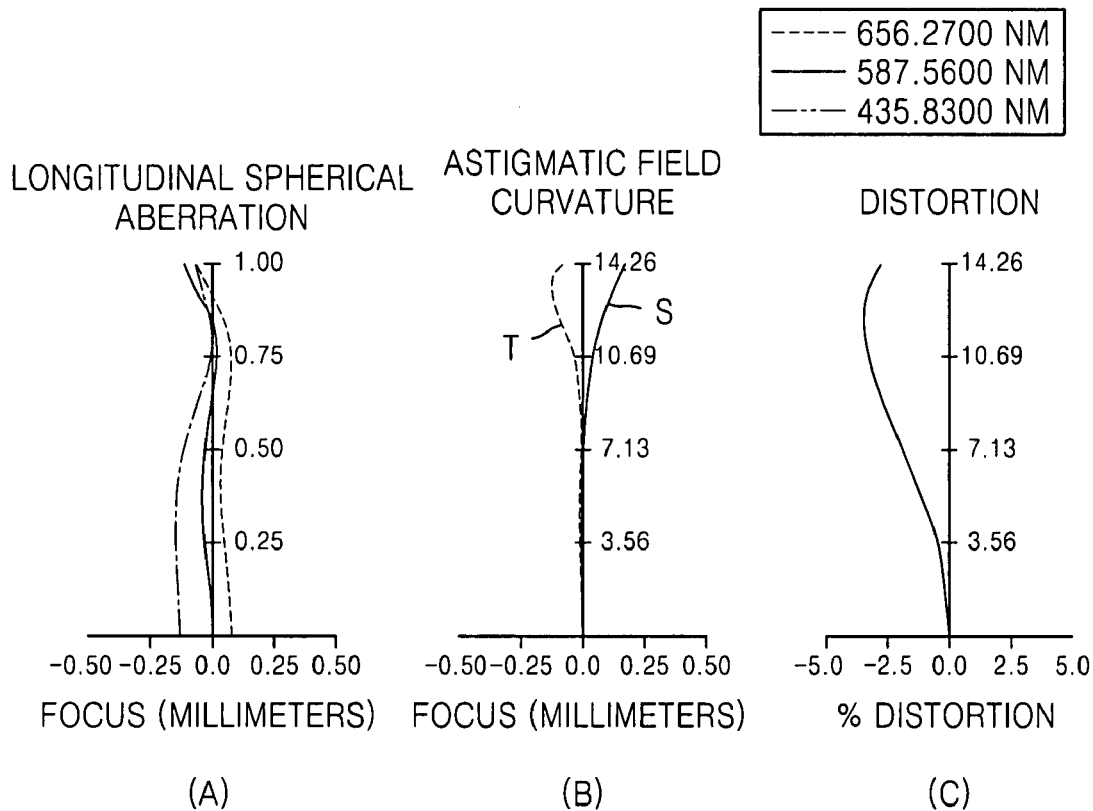
FIGS. 31A, 31B, and 31C respectively illustrate the spherical aberration, astigmatic field curvature, and distortion at the wide-angle position of the high magnification zoom lens of FIGS. 30A, 30B, and 30C.
Figure 32:
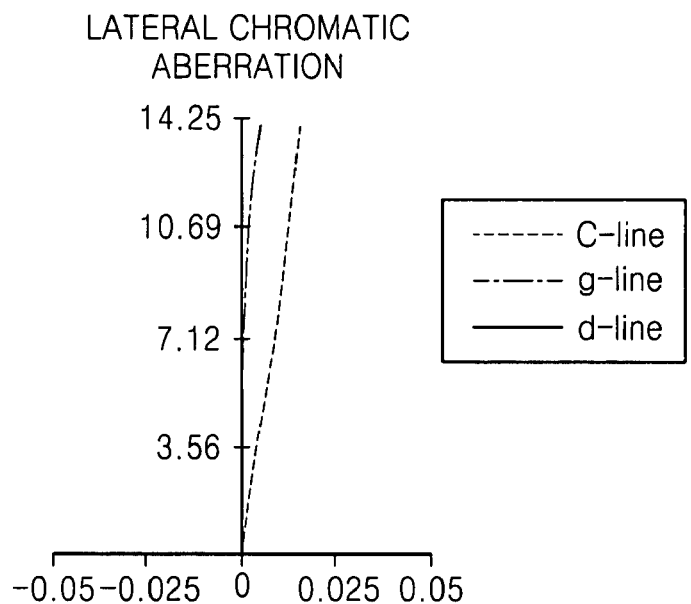
FIG. 32 illustrates the lateral color at the wide-angle position of the high magnification zoom lens of FIGS. 30A, 30B, and 30C.
Figure 33:
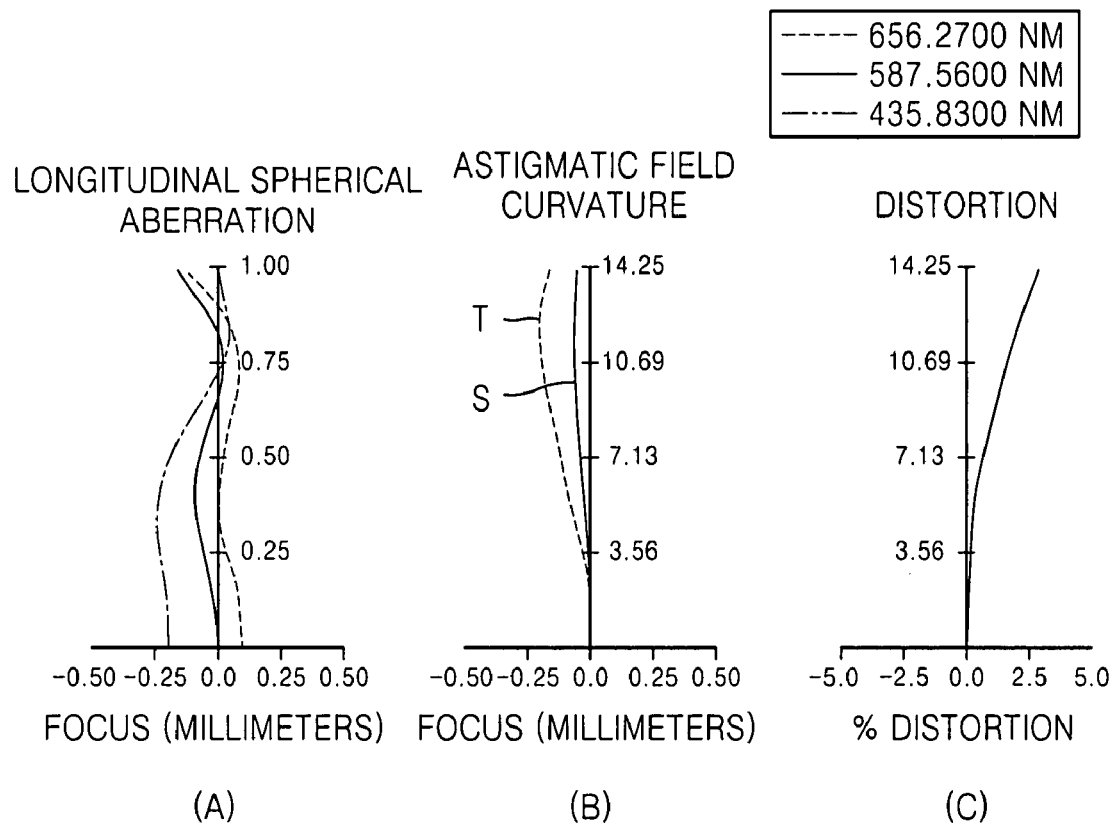
FIGS. 33A, 33B, and 33C respectively illustrate the spherical aberration, astigmatic field curvature, and distortion at the middle angle position of the high magnification zoom lens of FIGS. 30A, 30B, and 30C.
Figure 34:
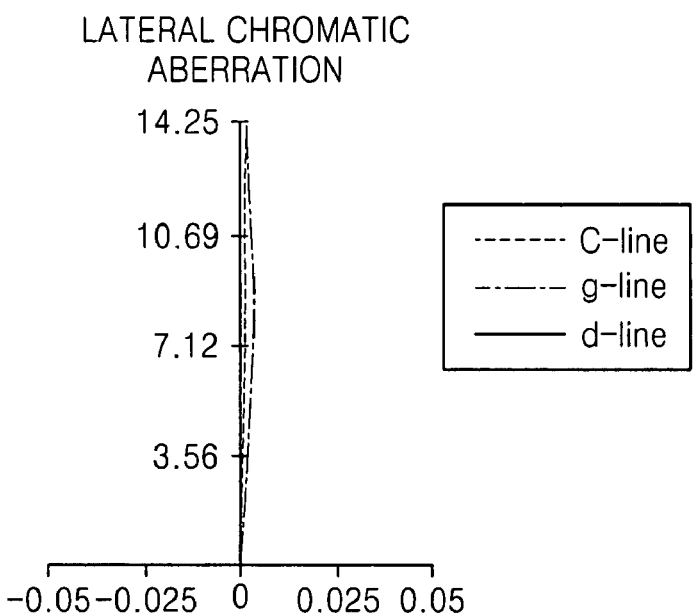
FIG. 34 illustrates the lateral color at the middle angle position of the high magnification zoom lens of FIGS. 30A, 30B, and 30C.
Figure 35:
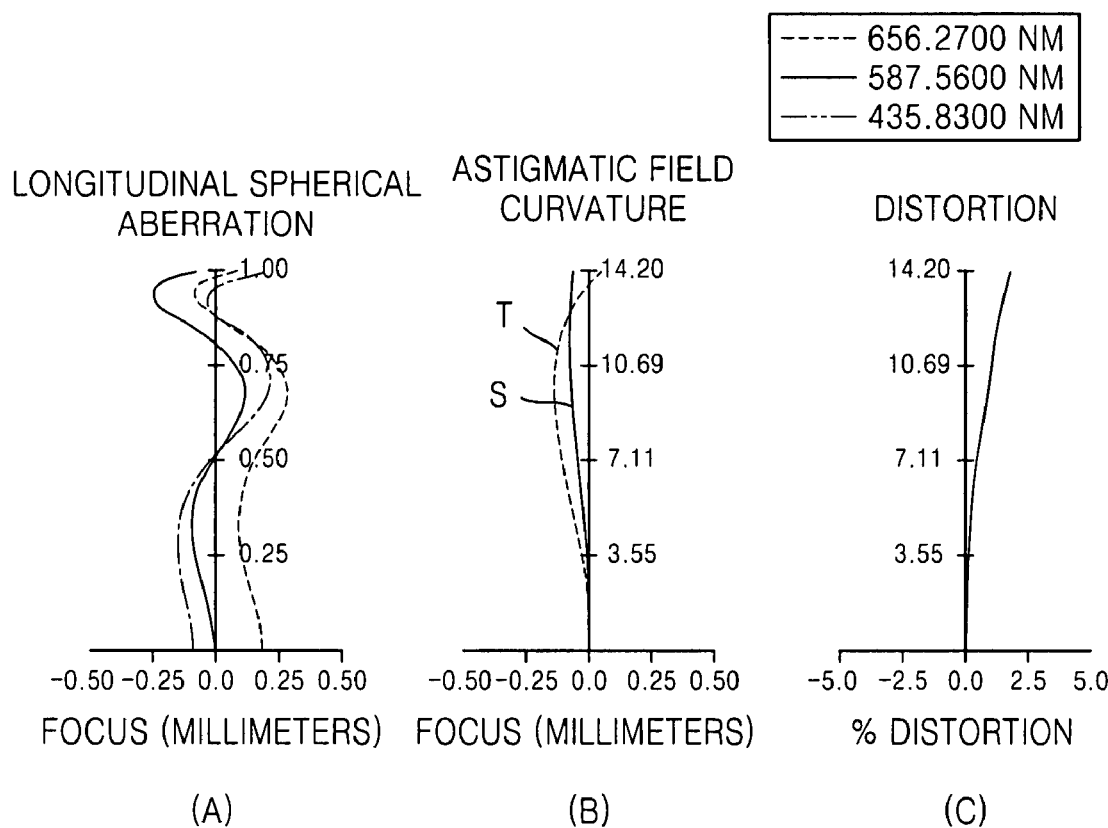
FIGS. 35A, 35B, and 35C respectively illustrate the spherical aberration, astigmatic field curvature, and distortion at the telephoto position of the high magnification zoom lens of FIGS. 30A, 30B, and 30C.
Figure 36:
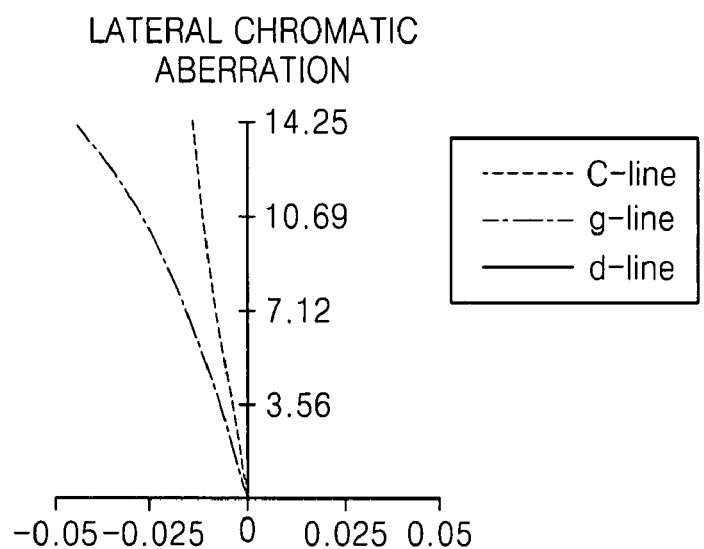
FIG. 36 illustrates the lateral color at the telephoto position of the high magnification zoom lens of FIGS. 30A, 30B, and 30C.
Figure 37:
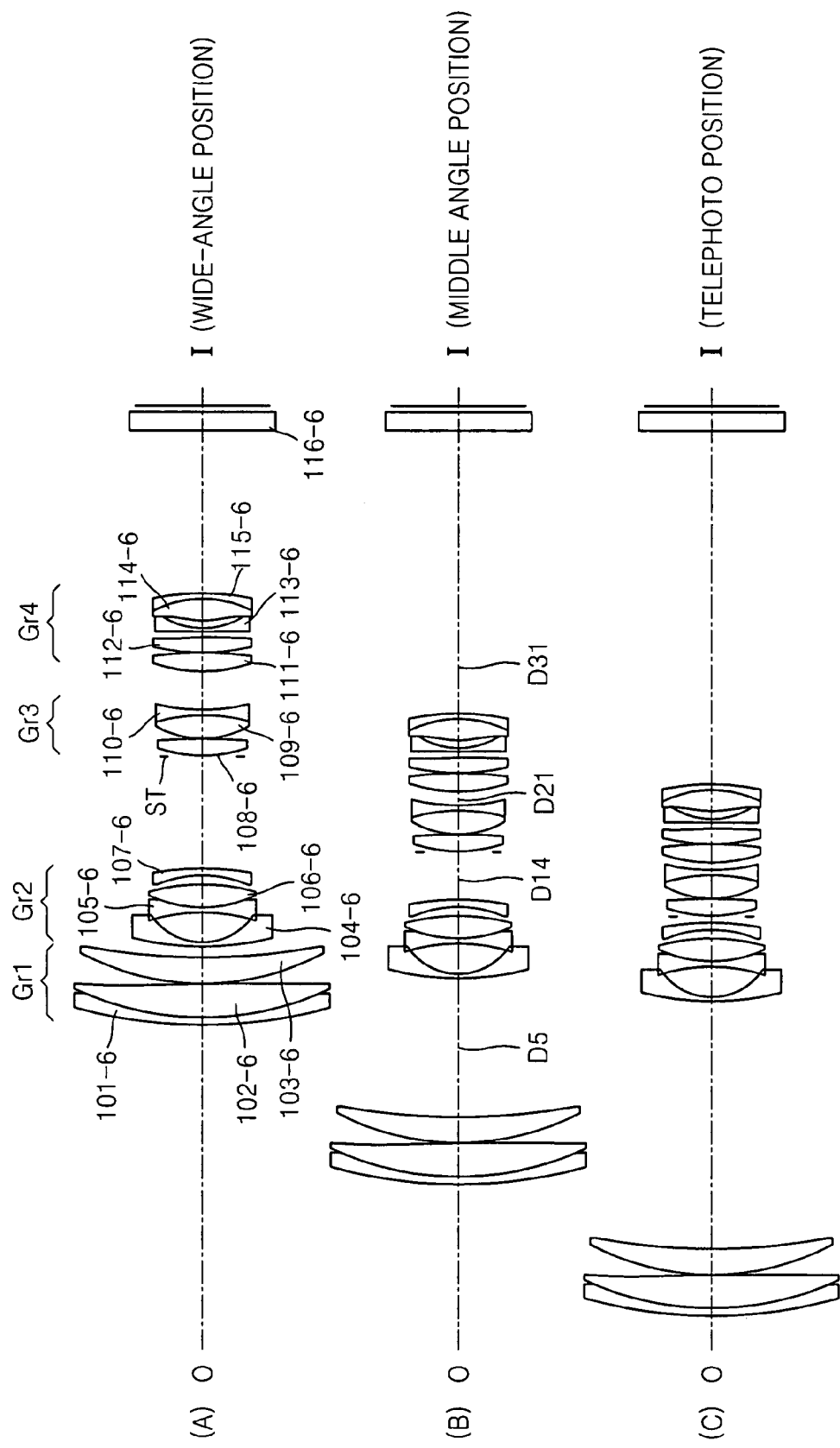
FIGS. 37A, 37B, and 37C respectively illustrate the configurations at a wide-angle position, a middle angle position, and a telephoto position of a high magnification zoom lens according to another embodiment of the present invention.
Figure 38:
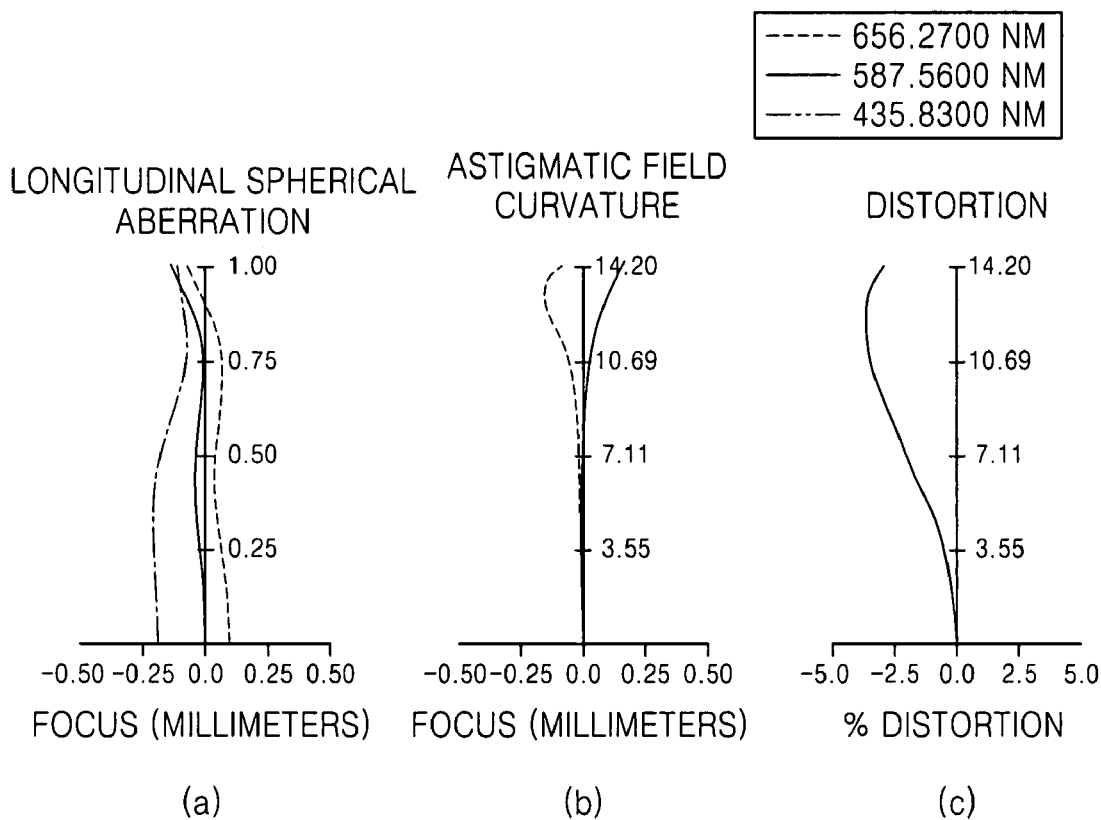
FIGS. 38A, 38B, and 38C respectively illustrate the spherical aberration, astigmatic field curvature, and distortion at the wide-angle position of the high magnification zoom lens of FIGS. 37A, 37B, and 37C.
Figure 39:
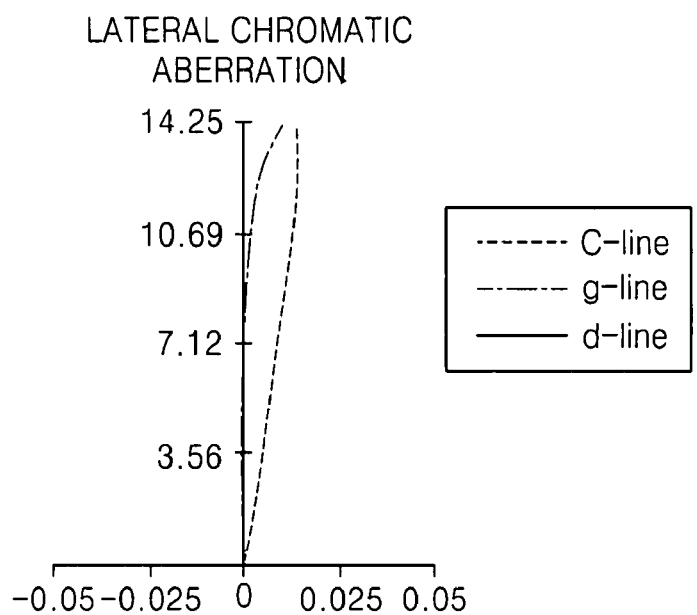
FIG. 39 illustrates the lateral color at the wide-angle position of the high magnification zoom lens of FIGS. 37A, 37B, and 37C.
Figure 40:
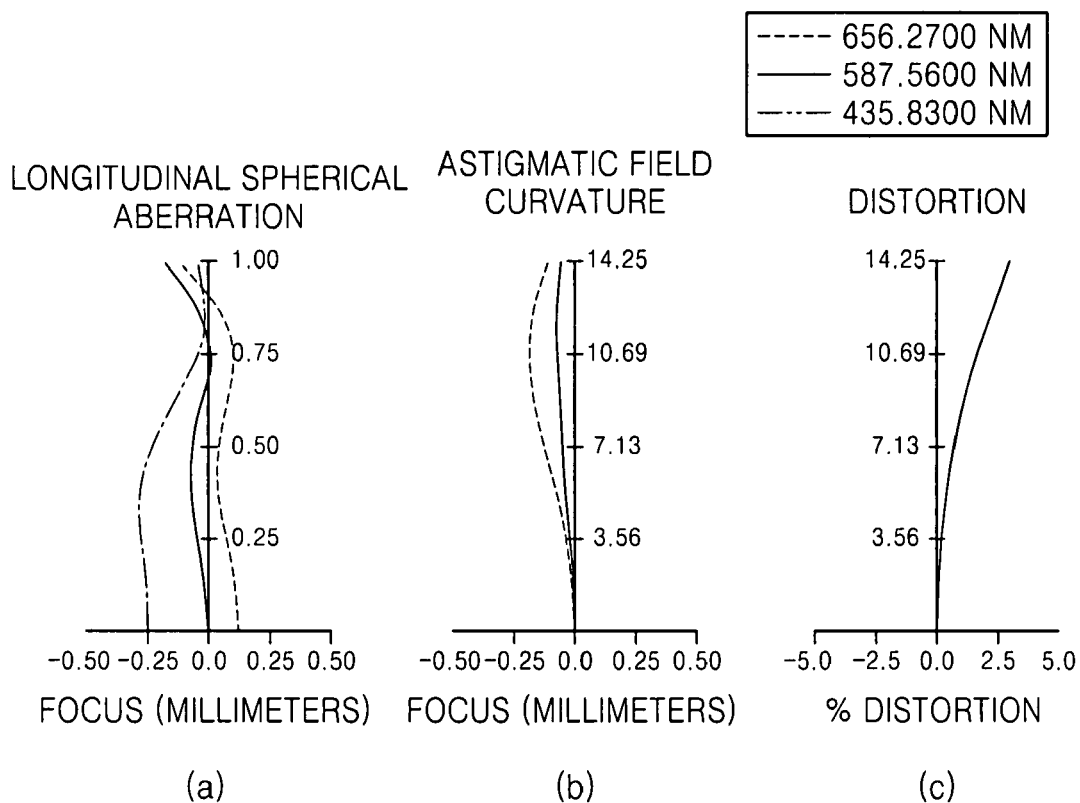
FIGS. 40A, 40B, and 40C respectively illustrate the spherical aberration, astigmatic field curvature, and distortion at the middle angle position of the high magnification zoom lens of FIGS. 37A, 37B, and 37C.
Figure 41:
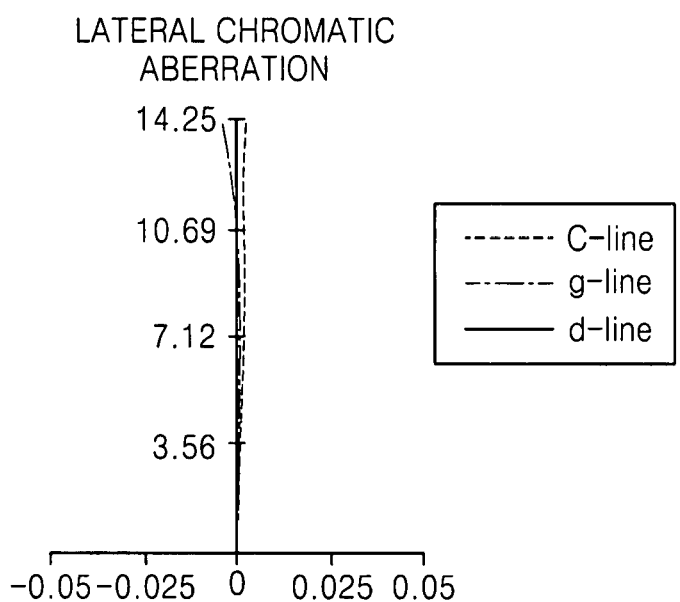
FIG. 41 illustrates the lateral color at the middle angle position of the high magnification zoom lens of FIGS. 37A, 37B, and 37C.
Figure 42:
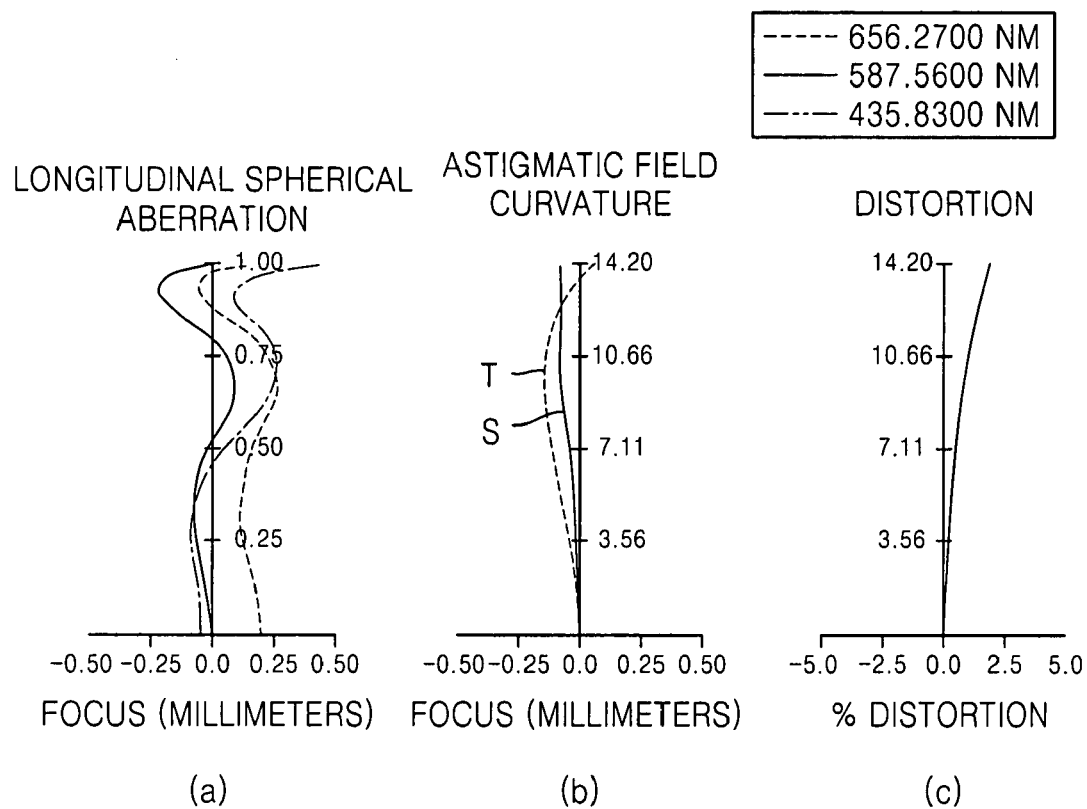
FIGS. 42A, 42B, and 42C respectively illustrate the spherical aberration, astigmatic field curvature, and distortion at the telephoto position of the high magnification zoom lens of FIGS. 37A, 37B, and 37C.
Figure 43:
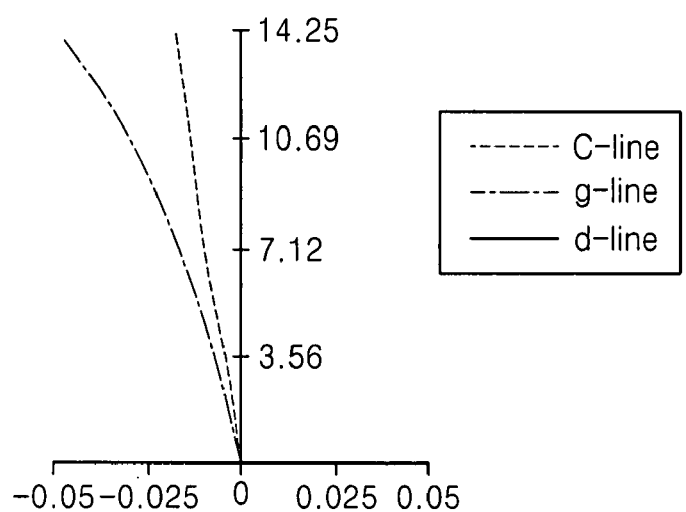
FIG. 43 illustrates the lateral color at the telephoto position of the high magnification zoom lens of FIGS. 37A, 37B, and 37C.
Figure 44:
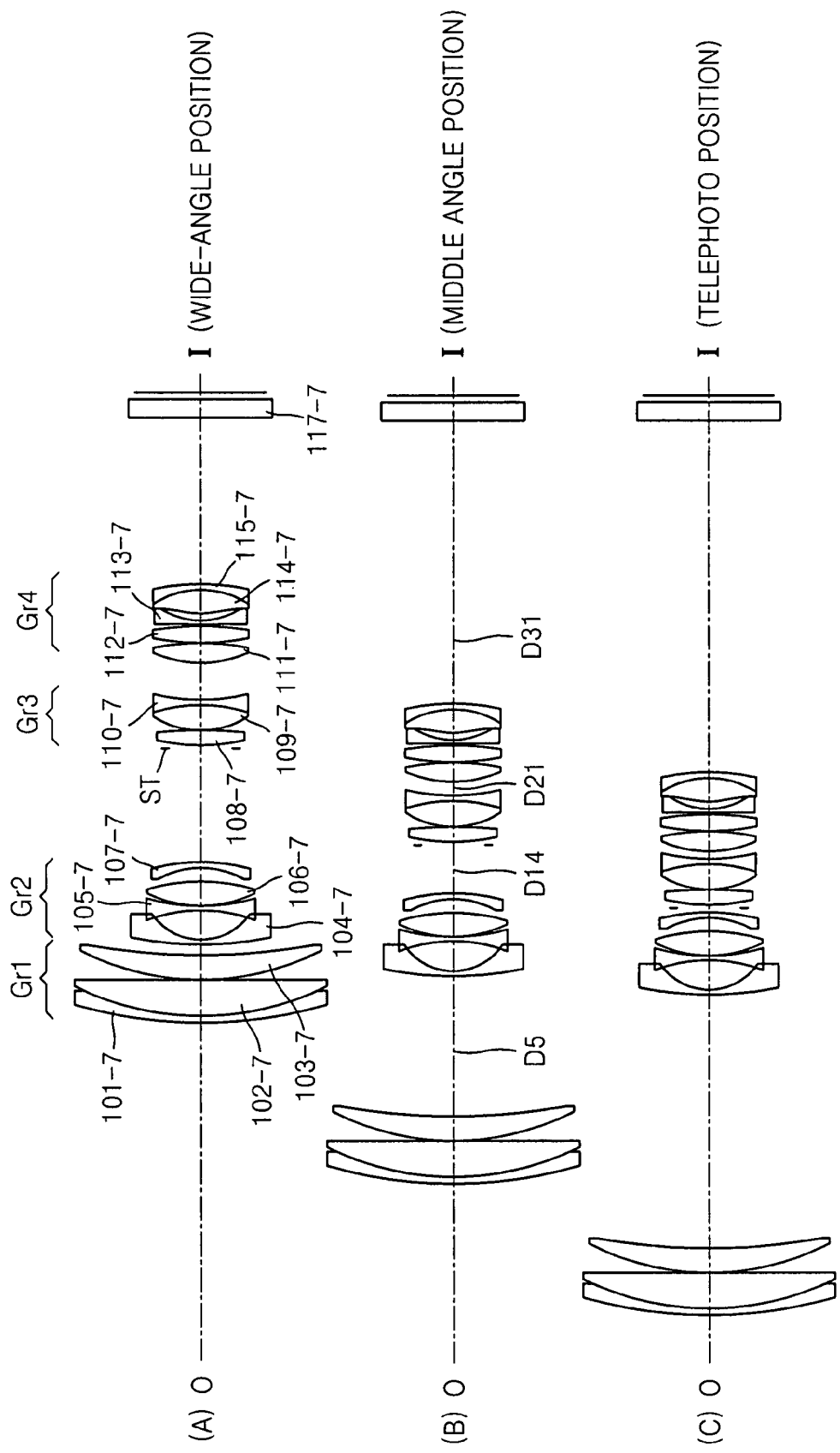
FIGS. 44A, 44B, and 44C respectively illustrate the configurations at a wide-angle position, a middle angle position, and a telephoto position of a high magnification zoom lens according to another embodiment of the present invention.
Figure 45:
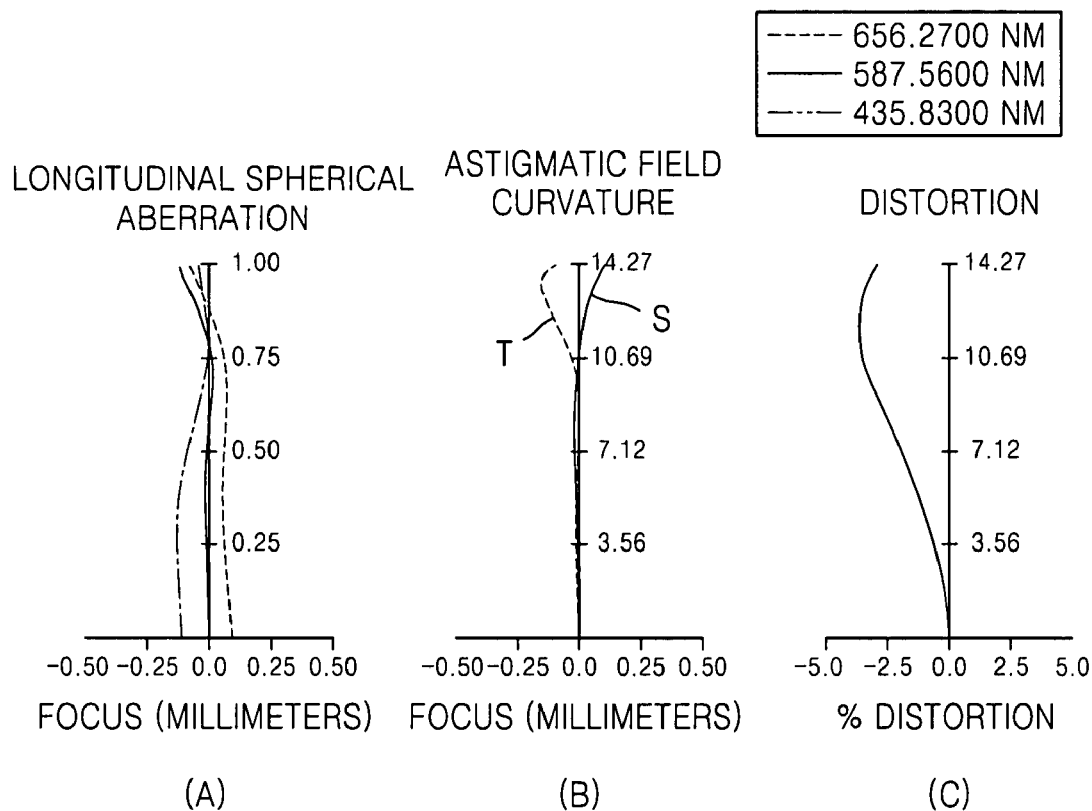
FIGS. 45A, 45B, and 45C respectively illustrate the spherical aberration, astigmatic field curvature, and distortion at the wide-angle position of the high magnification zoom lens of FIGS. 44A, 44B, and 44C.
Figure 46:
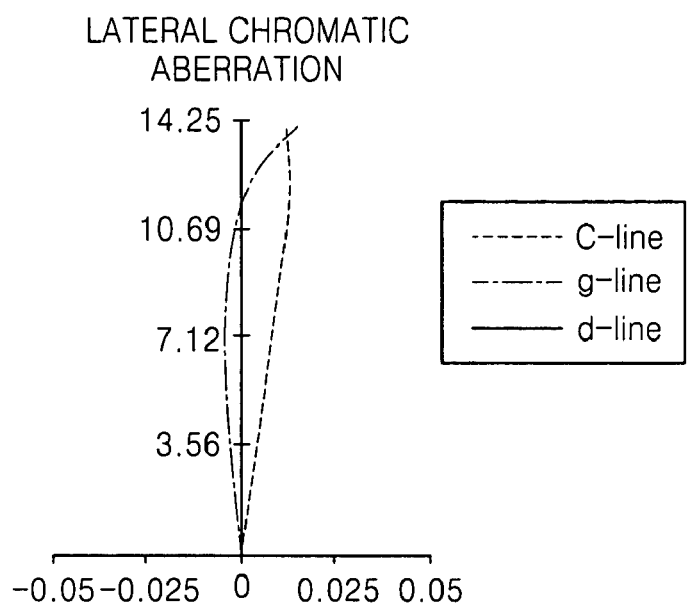
FIG. 46 illustrates the lateral color at the wide-angle position of the high magnification zoom lens of FIGS. 44A, 44B, and 44C.
Figure 47:
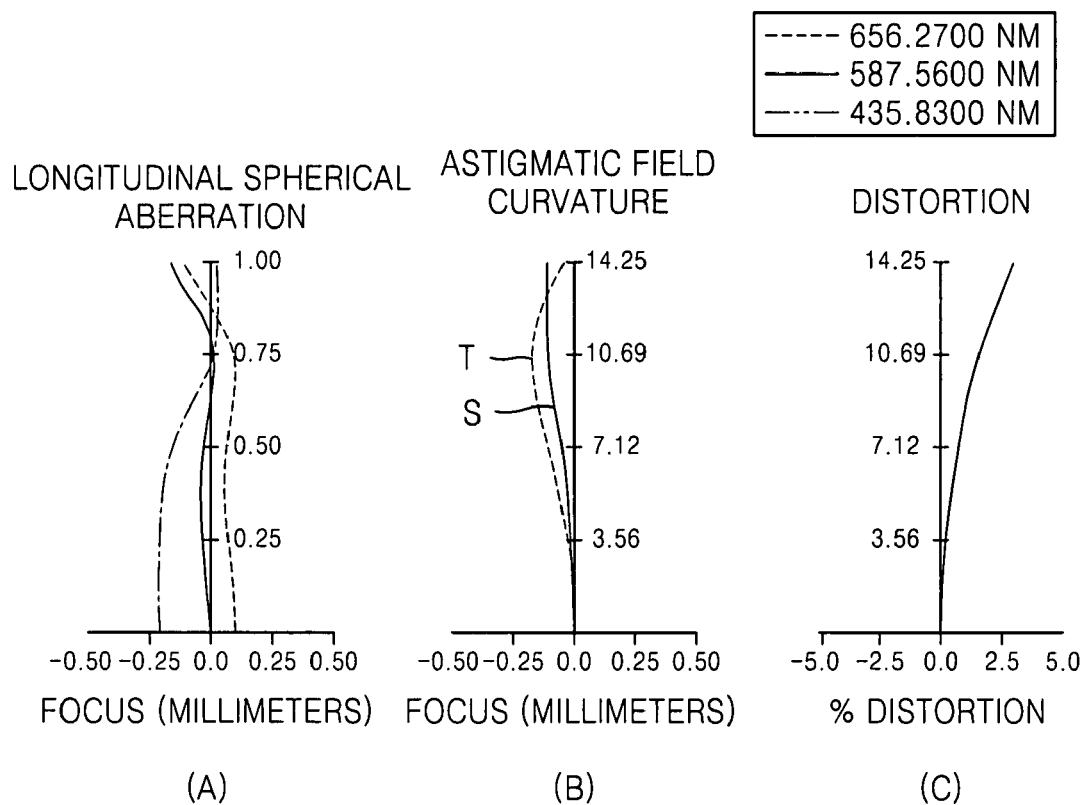
FIGS. 47A, 47B, and 47C respectively illustrate the spherical aberration, astigmatic field curvature, and distortion at the middle angle position of the high magnification zoom lens of FIGS. 44A, 44B, and 44C.
Figure 48:
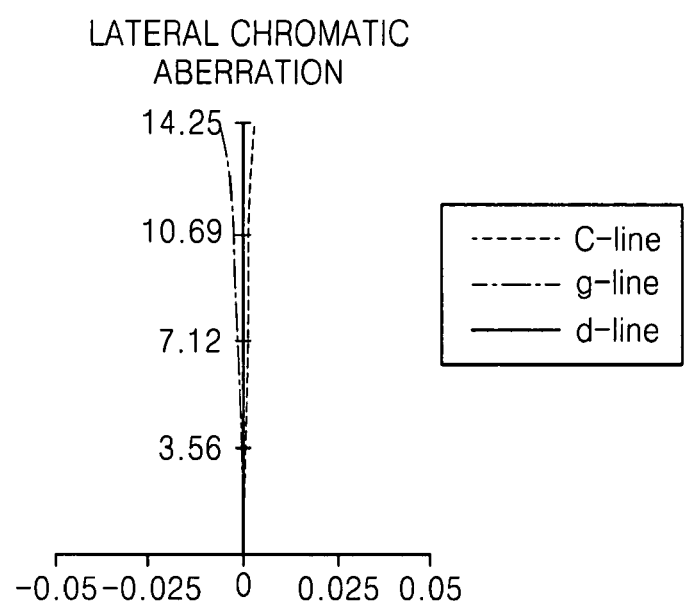
FIG. 48 illustrates the lateral color at the middle angle position of the high magnification zoom lens of FIGS. 44A, 44B, and 44C.
Figure 49:
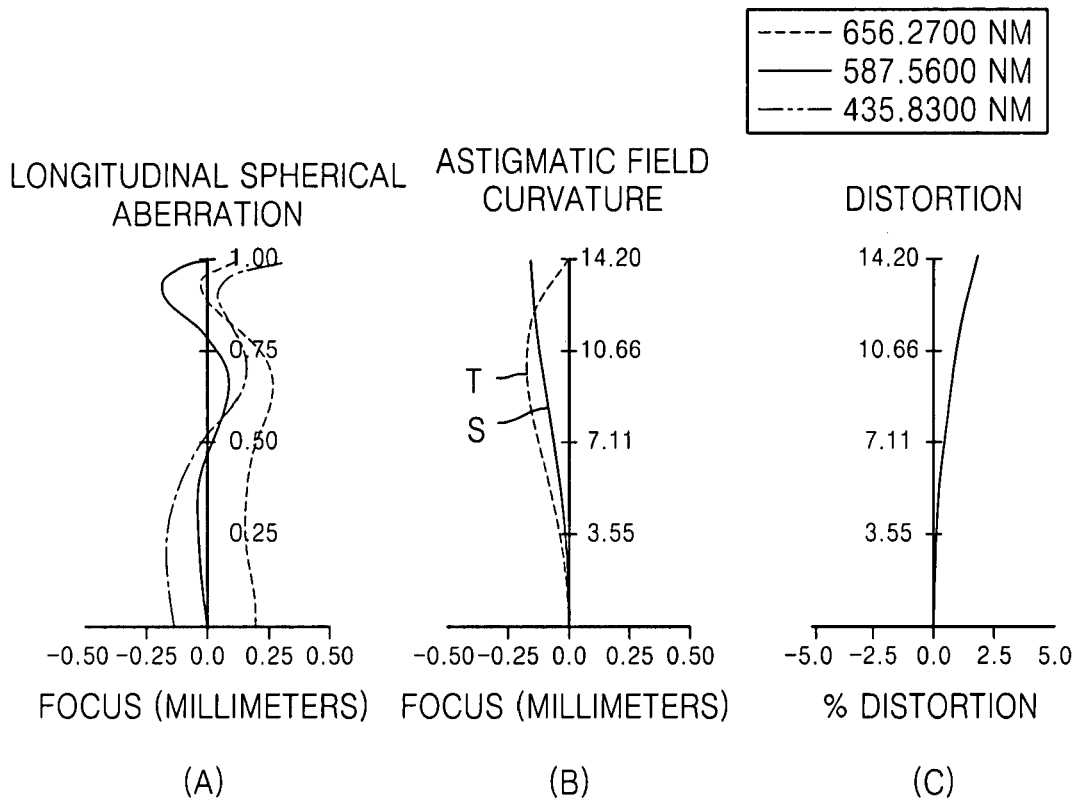
FIGS. 49A, 49B, and 49C respectively illustrate the spherical aberration, astigmatic field curvature, and distortion at the telephoto position of the high magnification zoom lens of FIGS. 44A, 44B, and 44C.
Figure 50:
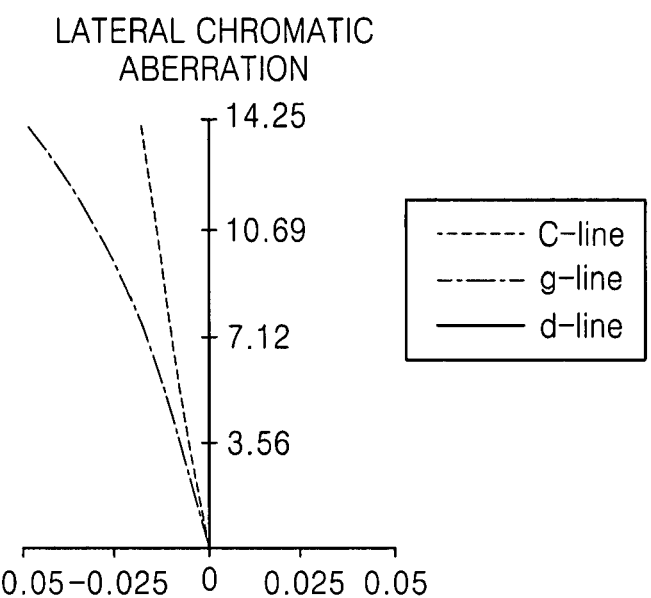
FIG. 50 illustrates the lateral color at the telephoto position of the high magnification zoom lens of FIGS. 44A, 44B, and 44C.
Figure 51:
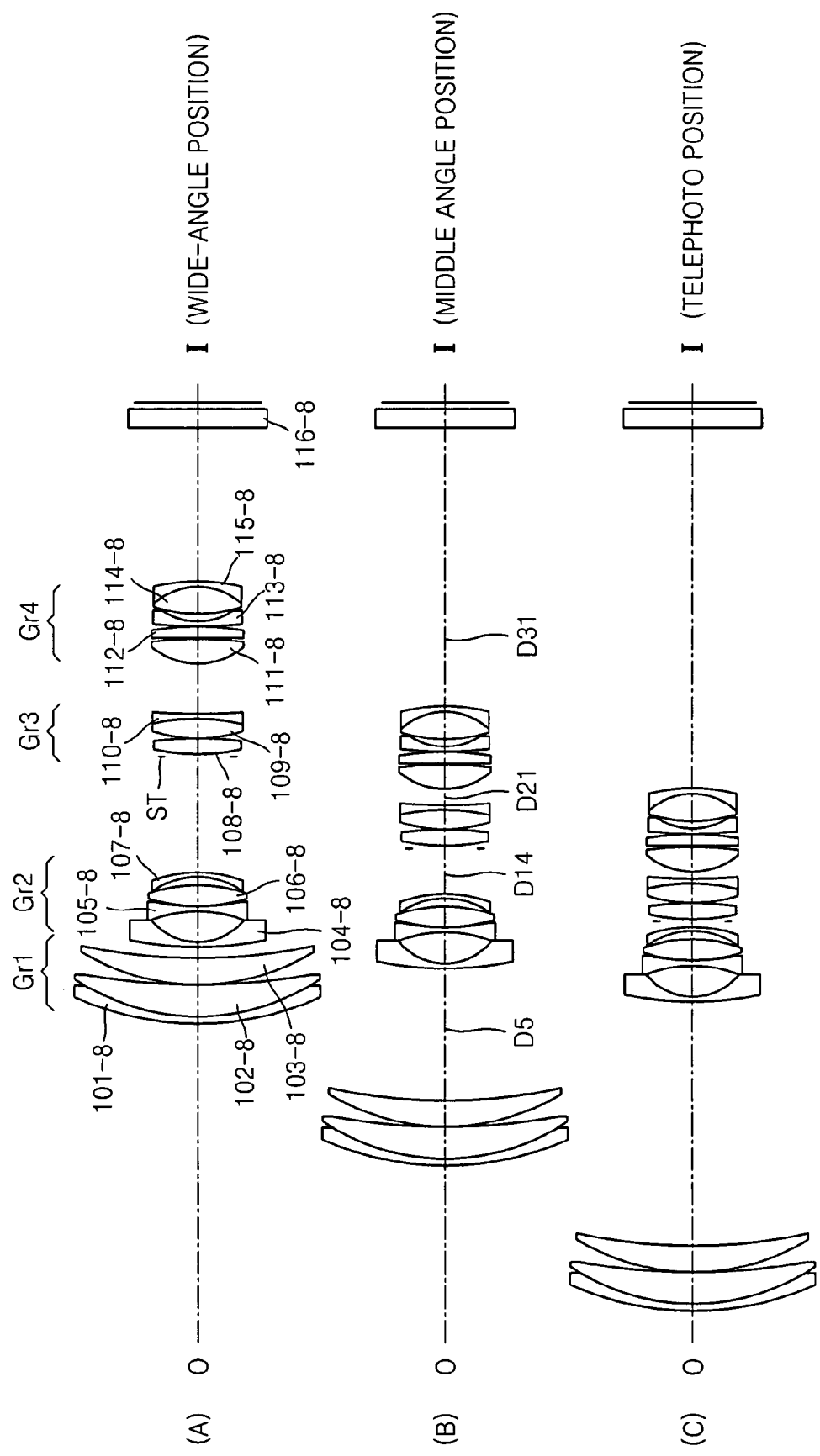
FIGS. 51A, 51B, and 51C respectively illustrate the configurations at a wide-angle position, a middle angle position, and a telephoto position of a high magnification zoom lens according to another embodiment of the present invention.
Figure 52:
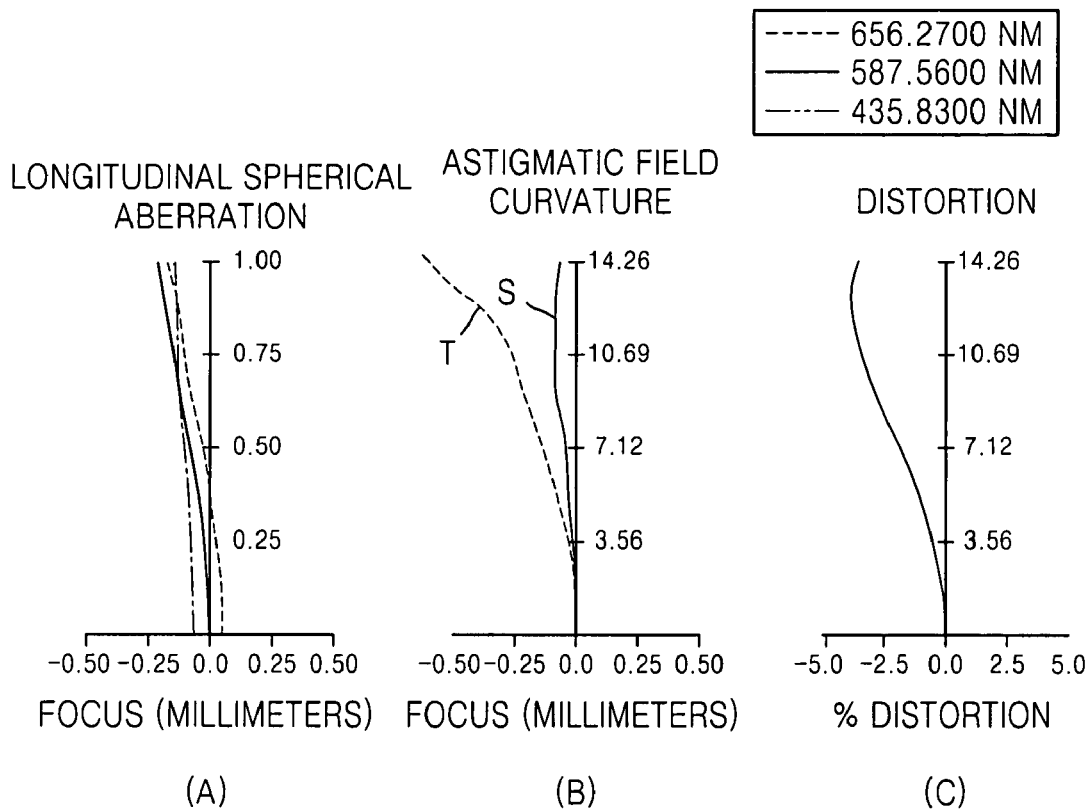
FIGS. 52A, 52B, and 52C respectively illustrate the spherical aberration, astigmatic field curvature, and distortion at the wide-angle position of the high magnification zoom lens of FIGS. 51A, 51B, and 51C.
Figure 53:
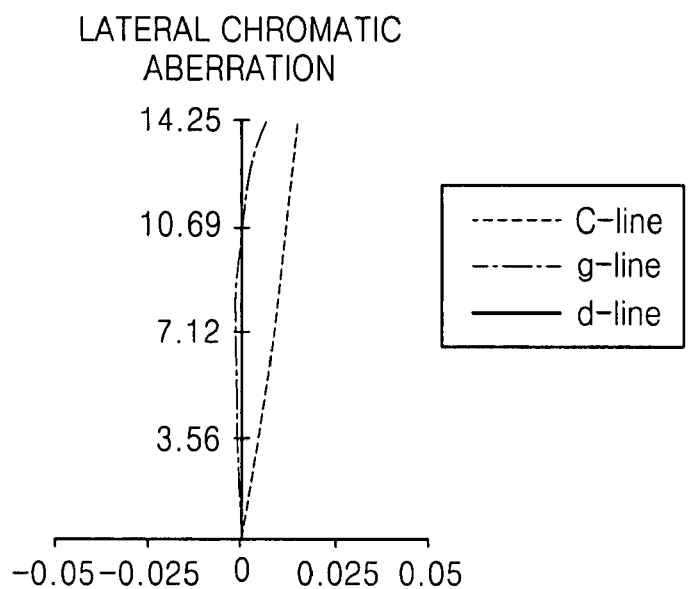
FIG. 53 illustrates the lateral color at the wide-angle position of the high magnification zoom lens of FIGS. 51A, 51B, and 51C.
Figure 54:
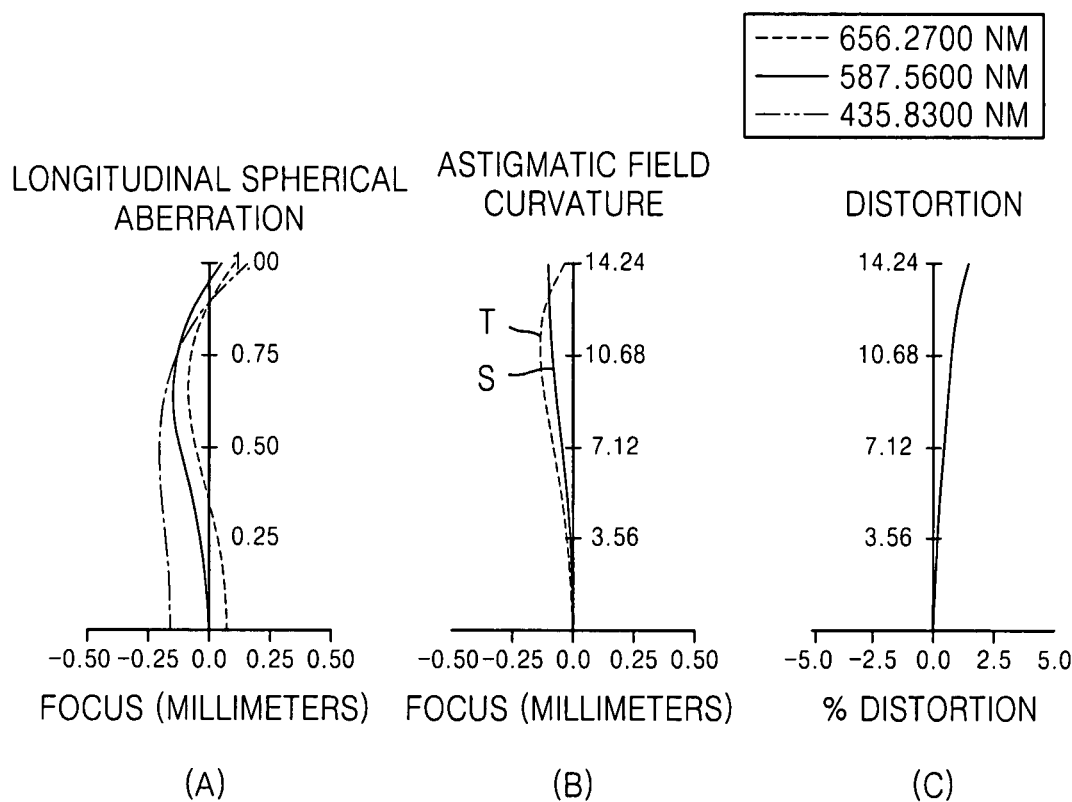
FIGS. 54A, 54B, and 54C respectively illustrate the spherical aberration, astigmatic field curvature, and distortion at the middle angle position of the high magnification zoom lens of FIGS. 51A, 51B, and 51C.
Figure 55:
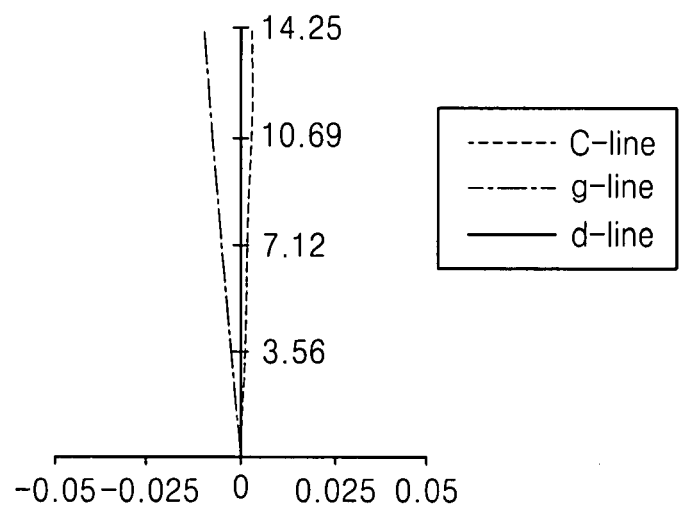
FIG. 55 illustrates the lateral color at the middle angle position of the high magnification zoom lens of FIGS. 51A, 51B, and 51C.
Figure 56:
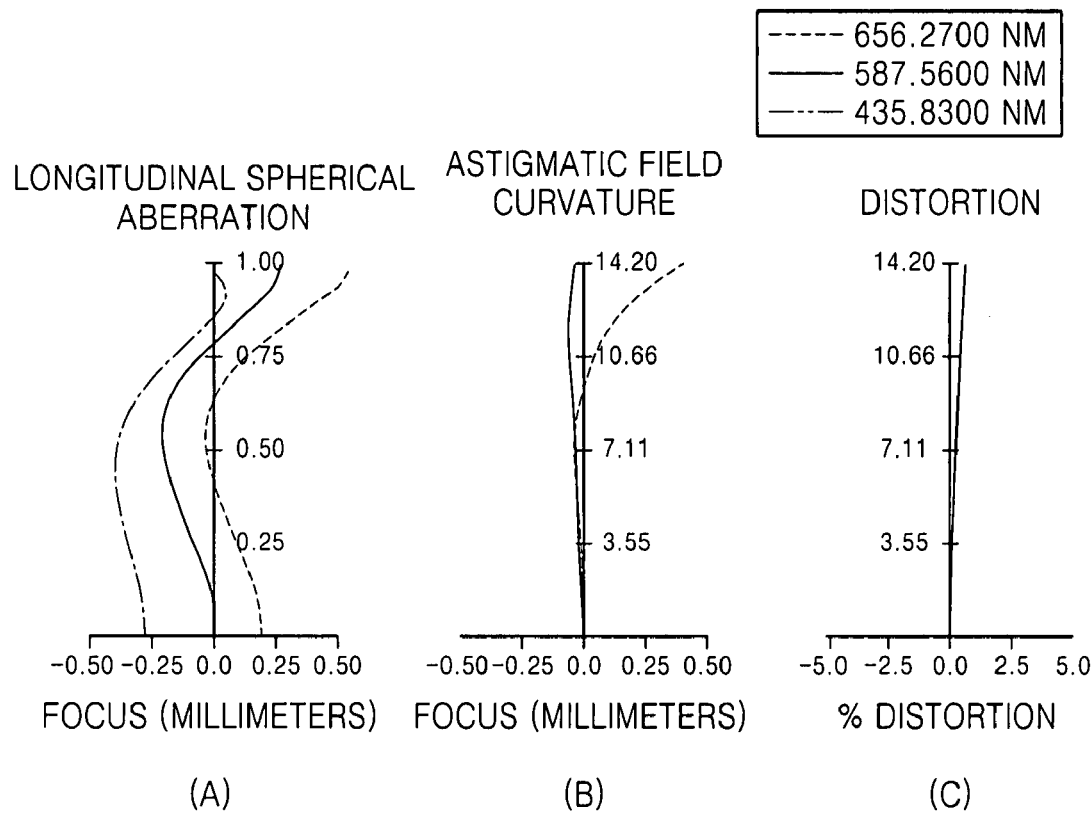
FIGS. 56A, 56B, and 56C respectively illustrate the spherical aberration, astigmatic field curvature, and distortion at the telephoto position of the high magnification zoom lens of FIGS. 51A, 51B, and 51C.
Figure 57:
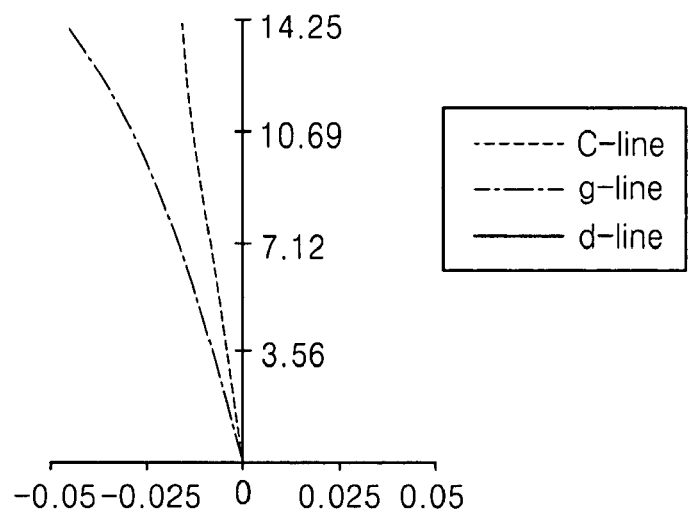
FIG. 57 illustrates the lateral color at the telephoto position of the high magnification zoom lens of FIGS. 51A, 51B, and 51C.

The fourth lens group Gr4 includes at least two positive lens elements and a doublet lens, and has a positive refractive power as a whole. In FIG. 2, the fourth lens group Gr4 includes, for example, an eleventh lens element 111-1 having positive refractive power, a twelfth lens element 112-1 having positive refractive power, and a positive doublet lens 113-1 and 114-1. Also, the fourth lens group Gr4 may include, as shown in FIG. 16, a positive eleventh lens element 111-3, a positive twelfth lens element 112-3, a negative thirteenth lens element 113-3, and a positive doublet lens 114-3 and 115-3 which are arranged respectively in order from the object side. The fourth lens group Gr4 may include at least one aspherical surface. For example, an aspherical surface may be formed at the first lens element from the object side. The aspherical surface may be formed of a hybrid lens.

The relationship between the overall focal length and the back focal length at the wide-angle position of the zoom lens is shown below.

$$0.40 < \frac{f_w}{f_{bw}} < 0.55 \qquad \text{[Inequality 1]}$$

In Inequality 1, $f_w$ is the focal length of the overall lens system at the wide-angle position and $f_{bw}$ is the back focal length of the lens system at the wide-angle position. Above the upper limit of Inequality 1, the back focal length to the focal length decreases. This is advantageous in the wide-angle position but fringe back used for a single lens reflex camera cannot be secured. Under the lower limit of Inequality 1, the fringe back can be secured but the zoom lens has a strong back focus so that greater negative distortion and astigmatic field curvature are generated.

The following is the magnification of the third and fourth lens groups. The zoom lens according to the present embodiment satisfies the following conditions.

$$0.35 < \frac{\beta_{3,4W}}{\beta_{3,4T}} < 0.43 \qquad \text{[Inequality 2]}$$

In Inequality 2, $\beta_{3,4w}$ is a combined magnification ratio of the third and fourth lens groups at the wide-angle position and $\beta_{3,4T}$ is a combined magnification of the third and fourth lens groups at the telephoto position. The third and fourth lens groups serve to maintain good astigmatism throughout the entire area of the zoom lens system by changing the interval therebetween during magnification change. Under the lower limit of Inequality 2, it is not possible to achieve high magnification change while maintaining good aberration of the overall lens system. In particular, the refractive power of the third and fourth lens groups become strong so that acceptable astigmatism cannot be maintained. Above the upper limit of Inequality 2, since the third and fourth lens groups have sufficient refractive power, high magnification can be achieved and the astigmatism is easily maintained in the overall lens system. However, when the refractive power increases, eccentricity sensitivity increases to an extent that manufacture of the lens system is difficult.

The zoom lens of the present embodiment has the following high magnification.

$$9 < \frac{f_T}{f_W} < 12 \quad \text{[Inequality 3]}$$

In Inequality 3, $f_T$ is the focal length of the overall lens system at the telephoto position and $f_W$ is the focal length of the overall lens system at the wide-angle position.

Preferably, the first lens group Gr1 satisfies the following condition.

$$0.15 < \frac{f_W}{f_1} < 0.22 \quad \text{[Inequality 4]}$$

In Inequality 4, $f_1$ is the focal length of the first lens group. Inequality 4 shows the refractive power of the first lens group. Under the lower limit of Inequality 4, the refractive power of the first lens group is weak and the focal length increases so that the magnification of the lens groups other than the first lens group at the telephoto end decreases. Thus, aberration is not increased and it is easy to correct aberration. However, when the back focal length is secured at the wide-angle position while maintaining a relatively short overall length, the negative refractive power of the second lens group, which is mainly responsible for the magnification change, decreases so that the amount of movement during the magnification change increases. Also, since the overall length at the telephoto position increases, the structure of the barrel becomes complicated. Above the upper limit of Inequality 4, the refractive power of the first lens group increases and the refractive power of the second lens group increases as well so that the amount of movement during the magnification change decreases. Thus, although it is advantageous to make a compact zoom lens and form a barrel, since the refractive power of the second lens group is too strong, significant aberration is generated in the second lens group. As a result, it is impossible to maintain good aberration throughout the overall area of the lens system.

The refractive power of the fourth lens group is shown below and the zoom lens according to the present embodiment satisfies the following condition.

$$0.28 < \frac{f_W}{f_4} < 0.47 \quad \text{[Inequality 5]}$$

In Inequality 5, $f_4$ is the focal length of the fourth lens group. Under the lower limit of Inequality 5, the refractive power of the fourth lens group decreases so that it is advantageous to secure the back focal length at the wide-angle position. Also, the relative eccentricity sensitivity of the third and fourth lens groups decrease. Thus, the effect of correcting astigmatism in the overall area of the lens system is insufficient with the relatively small amount of zoom movement. Above the upper limit of Inequality 5, the refractive power of the fourth lens group increases so that the correction of the astigmatism is advantageous. However, it is difficult to secure the back focal length at the wide-angle position and maintain the relative eccentricity sensitivity of the third lens group small.

The fourth lens group includes a lens element having positive refractive power, another lens element having positive refractive power, a lens element having negative refractive power and a strong concave surface facing the image side, and a doublet lens having positive refractive power as a whole which are arranged respectively in order from the object side. Since the fourth lens group is separated from the aperture stop toward the image side, a burden of correction of aberration changing in a viewing angle direction is great compared to the third lens group. Thus, the fourth lens group includes more lens elements than those of the third lens group. The lens having positive refractive power at the object side is formed of two lens units so that the flux of light divergent from the second lens group having negative refractive power is concentrated by the third lens group having positive refractive power and the flux of light accessing the fourth lens group parallel to each other is concentrated again on an image surface. Therefore, the generation of spherical aberration and coma aberration is mainly reduced, the lens having negative refractive power corrects spherical aberration, and the lens having positive refractive power at the image surface is formed of a doublet lens to correct lateral chromatic aberration.

Also, in the present embodiment, an aspherical lens is adopted in each of the second, third, and fourth lens groups. In the high magnification lens, the amount of zoom movement needed to achieve high zoom magnification increases and the size thereof increases. However, by adopting the aspherical surface, the number of lens elements of each lens group and the thickness of each lens group can be reduced to avoid increasing the overall size of the high magnification lens system. However, in the first lens group, even when the aspherical lens is adopted, it is difficult to correct all of the astigmatism, spherical aberration, and coma aberration. Also, in the high magnification zoom, since it is difficult to decrease the number of lens elements of the second lens group to less than three, the present embodiment does not adopt the aspherical lens.

In the present embodiment, focusing of an object at a short distance is performed by moving the second lens group. In general, in the zoom lens in which the first lens group has positive refractive power, focusing is usually performed by the first lens group. However, greater movement of the first lens group is required in a high magnification system, which results in greater consumption of energy and reduction in the amount of peripheral light and the change in aberration during movement of lens, in an auto-focus camera in which a focus lens group is moved by a motor. In contrast, when the focusing operation is performed by the second lens group, since the lens group for the magnification change is moved, the viewing angle is changed. However, since the second lens group is smaller than the first lens group, energy consumption is small and the reduction of the amount of peripheral light is small. Also, even when the zoom lens moves significantly during magnification change, aberration changes are small so that the aberration change in the focusing operation is small.

In the meantime, the aspherical surface in the present embodiment is defined as follows. Assuming that an optical axis direction is an X axis, a direction perpendicular to the optical axis direction is a Y axis, and the direction in which a light ray proceeds is positive, the shape of the aspherical surface of the zoom lens according to the present embodiment can be expressed by the following equation.

$$x = \frac{cy^2}{1+\sqrt{1-(K+1)c^2h^2}} + A_4h^4 + A_6h^6 + A_8h^8 + A_{10}h^{10}$$

In Equation 6, x is the distance from the apex of the lens in the optical axis direction, h is the distance in the direction perpendicular to the optical axis, K is a conic constant, $A_4$, $A_6$, and $A_8$, and $A_{10}$ are aspherical coefficients, and c is a reciprocal (1/R) of the radius of curvature at the apex of a lens.

The present invention is related to a zoom lens suitable for a photographing device of a camera which has a high magnification ratio of about 9-12 times. Also, a common focal length from wide-angle to telephoto of 28 mm to 300 mm converted in terms of a 35 mm photo lens is embodied by a single camera lens.

The present invention includes lenses according to optimal conditions to embody the miniaturization of a zoom lens according to embodiments through the following various designs. Detailed lens data of various embodiments of a zoom lens according to the present invention are described below. In the following description, f is a combined focal length of the overall zoom lens system, FNO is an F number, $2w$ is a viewing angle, fb is a back focal length, R is a radius of curvature, D is a thickness of the center of a lens or an interval between lenses, an Nd is refractive power, and Vd is an Abbe number. Also, St is an aperture stop and D5, D14, D22, D30, and D32 are variable distances. In drawings illustrating the embodiments, numerals of each embodiment correspond to reference numerals of each lens.

EMBODIMENT 1

FIGS. 2A, 2B, and 2C respectively illustrate a wide-angle position, a middle angle position, and a telephoto position of a high magnification zoom lens system according to an embodiment of the present invention. Reference numeral 115-1 denotes a filter.

TABLE 1

| Surface | Radius of Curvature (R) | Thickness or Distance (D) | Refractive Power (Nd) | Abbe Number (vd) |
|---|---|---|---|---|
| 1 | 119.139 | 1.30 | 1.84666 | 23.8 |
| 2 | 69.935 | 6.75 | 1.49700 | 81.6 |
| 3 | −6256.068 | 0.10 | | |
| 4 | 65.908 | 5.18 | 1.72916 | 54.7 |
| 5 | 212.268 | D5 | | |
| 6 | 923.887 | 0.03 | 1.53610 | 41.2 |
| 7 | 125.002 | 1.00 | 1.83500 | 43.0 |
| 8 | 15.334 | 6.39 | | |
| 9 | −32.817 | 1.00 | 1.80420 | 46.5 |
| 10 | 51.486 | 0.10 | | |
| 11 | 36.593 | 4.70 | 1.84666 | 23.8 |
| 12 | −36.593 | 2.24 | | |
| 13 | −18.995 | 1.00 | 1.77250 | 49.6 |
| 14 | −32.495 | D14 | | |
| 15 | Inf.(ST) | 0.60 | | |
| 16 | 34.600 | 0.15 | 1.53610 | 41.2 |
| 17 | 36.544 | 3.16 | 1.49700 | 81.6 |
| 18 | −655.923 | 0.10 | | |
| 19 | 21.362 | 5.02 | 1.48749 | 70.4 |
| 20 | −44.594 | 0.67 | | |
| 21 | −27.873 | 1.00 | 1.83400 | 37.3 |
| 22 | 258.467 | D22 | | |
| 23 | 56.957 | 0.14 | 1.53610 | 41.2 |
| 24 | 150.404 | 3.54 | 1.54072 | 47.2 |
| 25 | −31.968 | 0.10 | | |
| 26 | 90.189 | 3.46 | 1.51742 | 52.2 |
| 27 | −40.231 | 0.10 | | |
| 28 | 71.520 | 1.00 | 1.83400 | 37.3 |
| 29 | 15.133 | 3.15 | 1.51680 | 64.2 |
| 30 | 23.842 | D30 | | |
| 31 | Inf.(FILTER) | 4.00 | 1.51680 | 64.2 |
| 32 | Inf. | | | |

Table 2 shows the aspherical coefficients of the zoom lens according to the present embodiment.

TABLE 2

| | K | A4 | A6 | A8 | A10 |
|---|---|---|---|---|---|
| 6 | −1.000 | 2.28361E−05 | −4.47122E−08 | 9.92250E−11 | 7.16140E−14 |
| 16 | −1.000 | 1.10863E−05 | −7.06322E−09 | 5.21498E−10 | 0.00000E+00 |
| 23 | −1.000 | −4.96143E−05 | 3.47894E−08 | −3.06711E−11 | −1.15546E−12 |

Table 3 shows the F numbers, variable distances D5, D14, D22, and D30, and the back focal lengths at the wide-angle position, the middle angle position, and the telephoto position.

TABLE 3

| | Wide-angle End | Middle End | Telephoto End |
|---|---|---|---|
| f | 18.609 | 60.040 | 193.925 |
| FNO | 3.61 | 5.21 | 5.77 |

TABLE 3-continued

| | Wide-angle End | Middle End | Telephoto End |
|---|---|---|---|
| D5 | 2.760 | 30.833 | 59.564 |
| D14 | 30.740 | 12.199 | 1.001 |
| D22 | 6.475 | 2.695 | 1.741 |
| D30 | 34.404 | 60.818 | 75.600 |
| fb | 1.000 | 1.000 | 1.000 |

FIGS. 3A, 3B, 3C, and 4 respectively illustrate the spherical aberration, astigmatic field curvature, distortion, and lateral color at the wide-angle position of the high magnification zoom lens of FIGS. 2A, 2B, and 2C. FIGS. 5A, 5B, 5C, and 6 respectively illustrate the spherical aberration, astigmatic field curvature, distortion, and lateral color at the middle angle position of the high magnification zoom lens of FIGS. 2A, 2B, and 2C. FIGS. 7A, 7B, 7C, and 8 respectively illustrate the spherical aberration, astigmatic field curvature, distortion, and lateral color at the telephoto position of the high magnification zoom lens of FIGS. 2A, 2B, and 2C. The astigmatic field curvature is tangential astigmatic field curvature T and sagittal astigmatic field curvature S. In the following embodiments, the descriptions about the drawings and tables which are the same as those of the present embodiment are omitted.

EMBODIMENT 2

TABLE 4

| Surface | Radius of Curvature (R) | Thickness or Distance (D) | Refractive Power (Nd) | Abbe Number (vd) |
|---|---|---|---|---|
| 1 | 103.514 | 1.30 | 1.84666 | 23.8 |
| 2 | 63.226 | 7.10 | 1.49700 | 81.6 |
| 3 | 2650.078 | 0.10 | | |
| 4 | 63.216 | 5.35 | 1.72916 | 54.7 |
| 5 | 208.604 | D5 | | |
| 6 | 156.037 | 0.02 | 1.53610 | 41.2 |
| 7 | 83.049 | 1.00 | 1.83500 | 43 |
| 8 | 14.093 | 6.62 | | |
| 9 | −31.291 | 1.00 | 1.80420 | 46.5 |
| 10 | 45.045 | 0.10 | | |
| 11 | 32.289 | 4.91 | 1.84666 | 23.8 |
| 12 | −32.289 | 1.29 | | |
| 13 | −19.978 | 1.00 | 1.77250 | 49.6 |
| 14 | −53.299 | D14 | | |
| 15 | Inf.(STOP) | 0.60 | | |
| 16 | 37.477 | 0.20 | 1.53610 | 41.2 |
| 17 | 46.674 | 3.27 | 1.49700 | 81.6 |
| 18 | −77.808 | 0.10 | | |
| 19 | 21.948 | 5.41 | 1.48749 | 70.4 |
| 20 | −29.775 | 0.67 | | |
| 21 | −28.540 | 1.00 | 1.83400 | 37.3 |
| 22 | 63.945 | D22 | | |
| 23 | 40.092 | 0.03 | 1.53610 | 41.2 |
| 24 | 49.878 | 3.94 | 1.54072 | 47.2 |
| 25 | −36.201 | 0.10 | | |
| 26 | 84.390 | 3.04 | 1.51742 | 52.2 |
| 27 | −63.425 | 0.56 | | |
| 28 | −163.676 | 1.00 | 1.83400 | 37.3 |
| 29 | 24.273 | 1.76 | | |
| 30 | 329.972 | 3.34 | 1.51680 | 64.2 |
| 31 | −37.663 | D31 | | |
| 32 | Inf.(FILTER) | 4.00 | 1.51680 | 64.2 |
| 33 | Inf. | | | |

Table 5 shows the aspherical coefficients of the zoom lens according to the present embodiment.

TABLE 5

| | K | A4 | A6 | A8 | A10 |
|---|---|---|---|---|---|
| 6 | −1.000 | 1.88758E−05 | −4.51670E−08 | 1.61416E−10 | −1.44849E−13 |
| 16 | −1.000 | 2.92148E−06 | −1.27437E−07 | 2.17029E−09 | −1.22897E−11 |
| 23 | −1.000 | −2.85933E−05 | 3.00245E−08 | 1.02213E−11 | −9.76324E−13 |

TABLE 6

| | Wide-angle End | Middle End | Telephoto End |
|---|---|---|---|
| f | 18.599 | 60.058 | 193.962 |
| FNO | 3.61 | 5.40 | 5.77 |
| D5 | 2.515 | 30.107 | 56.056 |
| D14 | 26.990 | 10.923 | 1.000 |
| D22 | 7.716 | 2.772 | 1.600 |
| D31 | 34.400 | 61.690 | 76.538 |
| fb | 1.000 | 1.000 | 1.000 |

EMBODIMENT 3

TABLE 7

| Surface | Radius of Curvature (R) | Thickness or Distance (D) | Refractive Power (Nd) | Abbe Number (vd) |
|---|---|---|---|---|
| 1 | 116.292 | 1.30 | 1.84666 | 23.8 |
| 2 | 66.116 | 7.41 | 1.49700 | 81.6 |
| 3 | −737.336 | 0.10 | | |
| 4 | 58.421 | 5.47 | 1.72916 | 54.7 |
| 5 | 171.519 | D5 | | |
| 6 | 191.658 | 0.02 | 1.53610 | 41.2 |
| 7 | 92.634 | 1.00 | 1.83500 | 43 |
| 8 | 14.069 | 6.60 | | |
| 9 | −31.652 | 1.00 | 1.80420 | 46.5 |
| 10 | 40.913 | 0.10 | | |
| 11 | 30.882 | 5.08 | 1.84666 | 23.8 |
| 12 | −30.882 | 1.64 | | |
| 13 | −19.594 | 1.00 | 1.77250 | 49.6 |

TABLE 7-continued

| Surface | Radius of Curvature (R) | Thickness or Distance (D) | Refractive Power (Nd) | Abbe Number (vd) |
|---|---|---|---|---|
| 14 | −63.415 | D14 | | |
| 15 | Inf.(STOP) | 0.60 | | |
| 16 | 42.742 | 0.20 | 1.53610 | 41.2 |
| 17 | 55.950 | 3.14 | 1.49700 | 81.6 |
| 18 | −67.808 | 0.10 | | |
| 19 | 23.237 | 4.87 | 1.48749 | 70.4 |
| 20 | −36.957 | 0.60 | | |
| 21 | −33.264 | 1.00 | 1.83400 | 37.3 |
| 22 | 73.583 | D22 | | |
| 23 | 35.984 | 0.20 | 1.53610 | 41.2 |
| 24 | 50.645 | 3.88 | 1.58267 | 46.5 |
| 25 | −37.235 | 0.10 | | |
| 26 | 59.720 | 2.76 | 1.58267 | 46.5 |
| 27 | −195.429 | 1.04 | | |
| 28 | −194.587 | 1.00 | 1.83400 | 37.2 |
| 29 | 23.289 | 1.50 | | |
| 30 | 104.381 | 1.00 | 1.75520 | 27.5 |
| 31 | 31.057 | 4.56 | 1.54814 | 45.8 |
| 32 | −38.977 | D32 | | |
| 33 | Inf.(FILTER) | 4.00 | 1.51680 | 64.2 |
| 34 | Inf. | | | |

TABLE 8

| Surface | K | A4 | A6 | A8 | A10 |
|---|---|---|---|---|---|
| 6 | −1.000 | 1.94570E−05 | −4.86659E−08 | 1.82542E−10 | −2.80721E−13 |
| 16 | −1.000 | 2.94083E−06 | −1.50163E−07 | 2.52438E−09 | −1.45167E−11 |
| 23 | −1.000 | −2.42694E−05 | 6.53243E−08 | −5.05050E−10 | 1.50844E−12 |

TABLE 9

| | Wide-angle End | Middle End | Telephoto End |
|---|---|---|---|
| f | 18.598 | 60.059 | 193.907 |
| FNO | 3.6 | 5.40 | 5.77 |
| D5 | 2.387 | 29.293 | 53.974 |
| D14 | 24.214 | 10.021 | 1.000 |
| D22 | 8.147 | 2.991 | 1.600 |
| D32 | 34.413 | 61.771 | 76.124 |
| fb | 1.000 | 1.000 | 1.000 |

EMBODIMENT 4

TABLE 10

| Surface | Radius of Curvature (R) | Thickness or Distance (D) | Refractive Power (Nd) | Abbe Number (vd) |
|---|---|---|---|---|
| 1 | 111.458 | 1.30 | 1.84666 | 23.8 |
| 2 | 64.301 | 7.46 | 1.49700 | 81.6 |
| 3 | −943.418 | 0.10 | | |
| 4 | 58.051 | 5.52 | 1.72916 | 54.7 |
| 5 | 173.390 | D5 | | |
| 6 | 207.725 | 0.02 | 1.53610 | 41.2 |
| 7 | 94.222 | 1.00 | 1.83500 | 43 |

TABLE 10-continued

| Surface | Radius of Curvature (R) | Thickness or Distance (D) | Refractive Power (Nd) | Abbe Number (vd) |
|---|---|---|---|---|
| 8 | 13.999 | 6.61 | | |
| 9 | −31.219 | 1.00 | 1.80420 | 46.5 |
| 10 | 39.255 | 0.10 | | |
| 11 | 30.356 | 5.13 | 1.84666 | 23.8 |
| 12 | −30.356 | 1.73 | | |
| 13 | −19.325 | 1.00 | 1.77250 | 49.6 |
| 14 | −60.302 | D14 | | |
| 15 | Inf.(STOP) | 0.60 | | |
| 16 | 39.252 | 0.20 | 1.53610 | 41.2 |
| 17 | 49.693 | 3.13 | 1.49700 | 81.6 |
| 18 | −80.102 | 0.10 | | |
| 19 | 23.346 | 4.93 | 1.48749 | 70.4 |
| 20 | −34.273 | 0.69 | | |
| 21 | −30.598 | 1.00 | 1.83400 | 37.3 |
| 22 | 72.621 | D22 | | |
| 23 | 35.402 | 0.20 | 1.53610 | 41.2 |

TABLE 10-continued

| Surface | Radius of Curvature (R) | Thickness or Distance (D) | Refractive Power (Nd) | Abbe Number (vd) |
|---|---|---|---|---|
| 24 | 50.956 | 4.01 | 1.57099 | 50.9 |
| 25 | −33.910 | 0.10 | | |
| 26 | 87.874 | 2.88 | 1.54814 | 45.8 |
| 27 | −76.004 | 1.24 | | |
| 28 | −171.585 | 1.00 | 1.83400 | 37.3 |
| 29 | 22.760 | 1.59 | | |
| 30 | 120.663 | 4.58 | 1.54814 | 45.8 |
| 31 | −20.146 | 1.00 | 1.69895 | 30.1 |
| 32 | −37.636 | D32 | | |
| 33 | Inf.(FILTER) | 4.00 | 1.51680 | 64.2 |
| 34 | Inf. | | | |

TABLE 11

| surface | K | A4 | A6 | A8 | A10 |
|---|---|---|---|---|---|
| 6 | −1.000 | 2.07374E−05 | −4.59433E−08 | 1.61187E−10 | −2.39484E−13 |
| 16 | −1.000 | 1.81996E−06 | −1.59424E−07 | 2.72262E−09 | −1.54147E−11 |
| 23 | −1.000 | −2.31917E−05 | 7.10315E−08 | −6.82249E−10 | 2.55080E−12 |

TABLE 12

|  | Wide-angle End | Middle End | Telephoto End |
|---|---|---|---|
| f | 18.602 | 60.053 | 193.945 |
| FNO | 3.61 | 5.40 | 5.77 |
| 2w | 74.91 | 26.70 | 8.40 |
| D5 | 2.400 | 29.728 | 53.839 |
| D14 | 24.206 | 10.217 | 1.000 |
| D22 | 7.427 | 2.877 | 1.600 |
| D32 | 34.402 | 60.581 | 75.564 |
| fb | 1.000 | 1.000 | 1.000 |

EMBODIMENT 5

TABLE 13

| Surface | Radius of Curvature (R) | Thickness or Distance (D) | Refractive Power (Nd) | Abbe Number (vd) |
|---|---|---|---|---|
| 1 | 111.458 | 1.30 | 1.84666 | 23.8 |
| 2 | 64.301 | 7.46 | 1.49700 | 81.6 |
| 3 | −943.418 | 0.10 | | |
| 4 | 58.051 | 5.52 | 1.72916 | 54.7 |
| 5 | 173.390 | D5 | | |
| 6 | 207.725 | 0.02 | 1.53610 | 41.2 |
| 7 | 94.222 | 1.00 | 1.83500 | 43 |
| 8 | 13.999 | 6.61 | | |
| 9 | −31.219 | 1.00 | 1.80420 | 46.5 |
| 10 | 39.255 | 0.10 | | |
| 11 | 30.356 | 5.13 | 1.84666 | 23.8 |
| 12 | −30.356 | 1.73 | | |
| 13 | −19.325 | 1.00 | 1.77250 | 49.6 |
| 14 | −60.302 | D14 | | |
| 15 | Inf.(STOP) | 0.60 | | |
| 16 | 39.252 | 0.20 | 1.53610 | 41.2 |
| 17 | 49.693 | 3.13 | 1.49700 | 81.6 |
| 18 | −80.102 | 0.10 | | |
| 19 | 23.346 | 4.93 | 1.48749 | 70.4 |
| 20 | −34.273 | 0.69 | | |
| 21 | −30.598 | 1.00 | 1.83400 | 37.3 |
| 22 | 72.621 | D22 | | |
| 23 | 35.402 | 0.20 | 1.53610 | 41.2 |
| 24 | 50.956 | 4.01 | 1.57099 | 50.9 |
| 25 | −33.910 | 0.10 | | |
| 26 | 87.874 | 2.88 | 1.54814 | 45.8 |
| 27 | −76.004 | 1.24 | | |
| 28 | −171.585 | 1.00 | 1.83400 | 37.3 |
| 29 | 22.760 | 1.59 | | |
| 30 | 120.663 | 4.58 | 1.54814 | 45.8 |
| 31 | −20.146 | 1.00 | 1.69895 | 30.1 |
| 32 | −37.636 | D32 | | |
| 33 | Inf.(FILTER) | 4.00 | 1.51680 | 64.2 |
| 34 | Inf. | | | |

TABLE 14

| Surface | K | A4 | A6 | A8 | A10 |
|---|---|---|---|---|---|
| 6 | −1.000 | 2.06855E−05 | −5.38985E−08 | 1.95853E−10 | −2.96967E−13 |
| 16 | −1.000 | 3.41143E−06 | −1.49099E−07 | 2.45487E−09 | −1.38191E−11 |
| 23 | −1.000 | −2.79691E−05 | 6.98254E−08 | −5.05665E−10 | 1.45373E−12 |

TABLE 15

|  | Wide-angle End | Middle End | Telephoto End |
|---|---|---|---|
| f | 18.598 | 60.051 | 193.912 |
| FNO | 3.61 | 5.40 | 5.77 |
| D5 | 2.376 | 29.289 | 53.248 |
| D14 | 23.912 | 10.050 | 1.000 |
| D22 | 7.504 | 2.916 | 1.600 |
| D32 | 34.411 | 61.254 | 75.899 |
| fb | 1.000 | 1.000 | 1.000 |

EMBODIMENT 6

TABLE 16

| Surface | Radius of Curvature (R) | Thickness or Distance (D) | Refractive Power (Nd) | Abbe Number (vd) |
|---|---|---|---|---|
| 1 | 111.321 | 1.30 | 1.84666 | 23.8 |
| 2 | 64.506 | 7.42 | 1.49700 | 81.6 |
| 3 | −1012.345 | 0.10 | | |
| 4 | 57.981 | 5.49 | 1.72916 | 54.7 |
| 5 | 170.001 | D5 | | |
| 6 | 179.214 | 0.02 | 1.53610 | 41.2 |
| 7 | 85.755 | 1.00 | 1.83500 | 43.0 |
| 8 | 13.801 | 6.32 | | |

TABLE 16-continued

| Surface | Radius of Curvature (R) | Thickness or Distance (D) | Refractive Power (Nd) | Abbe Number (vd) |
|---|---|---|---|---|
| 9 | −29.987 | 1.00 | 1.80420 | 46.5 |
| 10 | 42.487 | 0.10 | | |
| 11 | 31.348 | 4.90 | 1.84666 | 23.8 |
| 12 | −31.348 | 2.14 | | |
| 13 | −18.793 | 1.00 | 1.77250 | 49.6 |
| 14 | −51.216 | D14 | | |
| 15 | Inf.(STOP) | 0.60 | | |
| 16 | 40.097 | 0.20 | 1.53610 | 41.2 |
| 17 | 51.832 | 3.32 | 1.43875 | 94.9 |
| 18 | −49.648 | 0.10 | | |
| 19 | 23.243 | 5.04 | 1.51742 | 52.2 |
| 20 | −30.167 | 1.00 | 1.83400 | 37.3 |
| 21 | 56.344 | D21 | | |
| 22 | 33.426 | 0.20 | 1.53610 | 41.2 |
| 23 | 44.636 | 3.83 | 1.58913 | 61.3 |
| 24 | −42.765 | 0.10 | | |
| 25 | 68.985 | 3.10 | 1.58144 | 40.9 |
| 26 | −90.275 | 1.12 | | |
| 27 | −191.78 | 1.00 | 1.83400 | 37.3 |
| 28 | 21.191 | 1.73 | | |
| 29 | 135.373 | 4.55 | 1.58144 | 40.9 |
| 30 | −19.524 | 1.00 | 1.76182 | 26.6 |
| 31 | −36.336 | D31 | | |
| 32 | Inf.(FILTER) | 4.00 | 1.51680 | 64.2 |
| 33 | Inf. | | | |

TABLE 17

| Surface | K | A4 | A6 | A8 | A10 |
|---|---|---|---|---|---|
| 6 | −1.000 | 2.12877E−05 | −5.34987E−08 | 2.00628E−10 | −2.84803E−13 |
| 16 | −1.000 | 2.01794E−06 | −1.40982E−07 | 2.44151E−09 | −1.40006E−11 |
| 22 | −1.000 | −2.02994E−05 | 6.13913E−08 | −5.64655E−10 | 1.95935E−12 |

TABLE 18

| | Wide-angle End | Middle End | Telephoto End |
|---|---|---|---|
| f | 18.595 | 60.069 | 193.923 |
| FNO | 3.61 | 5.40 | 5.77 |
| D5 | 2.368 | 30.147 | 53.678 |
| D14 | 23.835 | 10.120 | 1.000 |
| D21 | 8.123 | 2.983 | 1.600 |
| D31 | 34.423 | 60.439 | 76.004 |
| fb | 1.000 | 1.000 | 1.000 |

EMBODIMENT 7

TABLE 19

| Surface | Radius of Curvature (R) | Thickness or Distance (D) | Refractive Power (Nd) | Abbe Number (vd) |
|---|---|---|---|---|
| 1 | 111.743 | 1.30 | 1.84666 | 23.8 |
| 2 | 65.150 | 7.34 | 1.49700 | 81.6 |

TABLE 19-continued

| Surface | Radius of Curvature (R) | Thickness or Distance (D) | Refractive Power (Nd) | Abbe Number (vd) |
|---|---|---|---|---|
| 3 | −1083.310 | 0.10 | | |
| 4 | 58.682 | 5.44 | 1.72916 | 54.7 |
| 5 | 171.718 | D5 | | |
| 6 | 269.978 | 0.02 | 1.53610 | 41.2 |
| 7 | 95.628 | 1.00 | 1.83500 | 43.0 |
| 8 | 14.081 | 6.21 | | |
| 9 | −29.358 | 1.00 | 1.80420 | 46.5 |
| 10 | 41.488 | 0.10 | | |
| 11 | 31.601 | 5.07 | 1.84666 | 23.8 |
| 12 | −31.601 | 2.86 | | |
| 13 | −18.208 | 1.00 | 1.77250 | 49.6 |
| 14 | −41.239 | D14 | | |
| 15 | Inf.(STOP) | 0.60 | | |
| 16 | 46.135 | 0.16 | 1.53610 | 41.2 |
| 17 | 56.324 | 3.37 | 1.43875 | 94.9 |
| 18 | −42.910 | 0.10 | | |
| 19 | 21.523 | 5.32 | 1.51742 | 52.2 |
| 20 | −27.127 | 1.00 | 1.83400 | 37.3 |
| 21 | 48.546 | D21 | | |
| 22 | 26.135 | 0.02 | 1.53610 | 41.2 |
| 23 | 27.872 | 4.34 | 1.56883 | 56.0 |
| 24 | −47.251 | 0.10 | | |

TABLE 19-continued

| Surface | Radius of Curvature (R) | Thickness or Distance (D) | Refractive Power (Nd) | Abbe Number (vd) |
|---|---|---|---|---|
| 25 | 67.651 | 2.93 | 1.61310 | 44.4 |
| 26 | −85.508 | 0.56 | | |
| 27 | −884.005 | 1.00 | 1.83400 | 37.3 |
| 28 | 18.397 | 1.78 | | |
| 29 | 82.030 | 4.94 | 1.60562 | 43.9 |
| 30 | −17.056 | 1.00 | 1.83400 | 37.3 |
| 31 | −39.619 | D31 | | |
| 32 | Inf.(FILTER) | 4.00 | 1.51680 | 64.2 |
| 33 | Inf. | | | |

TABLE 20

| Surface | K | A4 | A6 | A8 | A10 |
|---|---|---|---|---|---|
| 6 | −1.000 | 2.37306E−05 | −6.70281E−08 | 2.53625E−10 | −3.77265E−13 |
| 16 | −1.000 | 2.94368E−06 | −1.10467E−07 | 1.96479E−09 | −1.07803E−11 |
| 22 | −1.000 | −1.67855E−05 | 6.46721E−08 | −7.49482E−10 | 2.94548E−12 |

TABLE 21

|  | Wide-angle End | Middle End | Telephoto End |
|---|---|---|---|
| f | 18.594 | 60.057 | 193.984 |
| FNO | 3.61 | 5.40 | 5.77 |
| D5 | 2.398 | 30.162 | 54.412 |
| D14 | 24.235 | 10.248 | 1.000 |
| D21 | 7.722 | 2.826 | 1.600 |
| D31 | 34.411 | 60.575 | 75.309 |
| fb | 1.000 | 1.000 | 1.000 |

EMBODIMENT 8

TABLE 22

| Surface | Radius of Curvature (R) | Thickness or Distance (D) | Refractive Power (Nd) | Abbe Number (vd) |
|---|---|---|---|---|
| 1 | 77.623 | 1.30 | 1.84666 | 23.8 |
| 2 | 52.595 | 7.25 | 1.49700 | 81.6 |
| 3 | 286.202 | 0.10 | | |
| 4 | 57.978 | 5.38 | 1.72916 | 54.7 |
| 5 | 161.599 | D5 | | |
| 6 | 267.543 | 0.02 | 1.53610 | 41.2 |
| 7 | 79.502 | 1.00 | 1.83500 | 43.0 |
| 8 | 13.481 | 6.83 | | |
| 9 | −29.358 | 1.00 | 1.80420 | 46.5 |
| 10 | 44.272 | 0.10 | | |
| 11 | 33.111 | 4.76 | 1.84666 | 23.8 |
| 12 | −33.111 | 1.71 | | |
| 13 | −17.870 | 1.00 | 1.77250 | 49.6 |
| 14 | −33.587 | D14 | | |
| 15 | Inf.(STOP) | 0.60 | | |
| 16 | 47.424 | 0.02 | 1.53610 | 41.2 |
| 17 | 48.245 | 3.46 | 1.43875 | 94.9 |
| 18 | −65.481 | 0.10 | | |
| 19 | 37.015 | 4.21 | 1.51742 | 52.1 |
| 20 | −42.024 | 1.00 | 1.83400 | 37.3 |
| 21 | 154.123 | D21 | | |
| 22 | 16.674 | 0.02 | 1.53610 | 41.2 |
| 23 | 16.505 | 5.48 | 1.48749 | 70.4 |
| 24 | −65.020 | 0.10 | | |
| 25 | 2371.342 | 2.51 | 1.48749 | 70.4 |
| 26 | −61.171 | 0.10 | | |
| 27 | 67.542 | 1.00 | 1.83400 | 37.3 |
| 28 | 14.954 | 1.71 | | |
| 29 | 34.518 | 6.04 | 1.59551 | 39.2 |
| 30 | −13.550 | 1.00 | 1.83400 | 37.3 |
| 31 | −55.649 | D31 | | |
| 32 | Inf.(FILTER) | 4.00 | 1.51680 | 64.2 |
| 33 | Inf. | | | |

TABLE 23

| Surface | K | A4 | A6 | A8 | A10 |
|---|---|---|---|---|---|
| 7 | −1.000 | 2.98624E−05 | −6.74560E−08 | 1.60510E−10 | 1.10978E−13 |
| 17 | −1.000 | −2.16915E−06 | −4.77683E−09 | 1.20000E−12 | 0.00000E+00 |
| 23 | −1.000 | 8.30812E−06 | −1.17966E−08 | 0.00000E+00 | 0.00000E+00 |

The following tables show that the above-described embodiments satisfy the conditions of the above Inequalities 1, 2, 4, and 5.

TABLE 24

|  | Wide-angle End | Middle End | Telephoto End |
|---|---|---|---|
| F | 18.649 | 60.059 | 193.710 |
| FNO | 3.61 | 5.40 | 5.80 |
| 2w | 74.77 | 26.70 | 8.41 |
| D5 | 2.482 | 28.921 | 53.626 |
| D14 | 25.205 | 10.119 | 1.000 |
| D21 | 11.034 | 3.839 | 1.600 |
| D31 | 34.393 | 62.163 | 80.940 |
| Fb | 1.000 | 1.000 | 1.000 |

TABLE 25

| Inequality | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| $0.4 < f_W/f_{bW} < 0.55$ | 0.489 | 0.489 | 0.489 | 0.489 | 0.489 | 0.489 | 0.489 | 0.490 |
| $0.35 < \beta_{3,4W}/\beta_{3,4T} < 0.43$ | 0.380 | 0.397 | 0.406 | 0.406 | 0.409 | 0.409 | 0.410 | 0.372 |
| $0.15 < f_W/f_1 < 0.22$ | 0.183 | 0.196 | 0.204 | 0.204 | 0.207 | 0.206 | 0.203 | 0.199 |
| $0.28 < f_W/f_4 < 0.47$ | 0.338 | 0.371 | 0.393 | 0.405 | 0.418 | 0.390 | 0.403 | 0.375 |
| $f_W$ | 18.609 | 18.599 | 18.598 | 18.602 | 18.598 | 18.595 | 18.594 | 18.649 |
| $f_{bW}$ | 38.041 | 38.037 | 38.050 | 38.040 | 38.048 | 38.060 | 38.048 | 38.030 |
| $\beta_{3W}$ | −8.541 | −16.043 | 28.692 | 12.256 | 9.521 | 24.405 | 12.338 | 14.004 |
| $\beta_{4W}$ | 0.104 | 0.062 | −0.037 | −0.086 | −0.112 | −0.044 | −0.085 | −0.072 |
| $\beta_{3T}$ | 3.612 | 3.194 | 2.838 | 2.636 | 2.494 | 2.861 | 2.645 | 2.705 |
| $\beta_{4T}$ | −0.646 | −0.778 | −0.917 | −0.982 | −1.044 | −0.915 | −0.971 | −1.007 |
| $f_1$ | 101.420 | 94.926 | 91.013 | 91.016 | 89.887 | 90.486 | 91.469 | 93.776 |
| $f_4$ | 54.974 | 50.162 | 47.376 | 45.943 | 44.517 | 47.727 | 46.196 | 49.788 |

Table 26 shows the focal length and magnification at the telephoto end for each embodiment.

TABLE 26

| | Embodiment | | | | | | | |
|---|---|---|---|---|---|---|---|---|
| | 1 | 2 | 3 | 4 | 5 | 6 | 7 | 8 |
| Ft | 193.9251 | 193.9623 | 193.9068 | 193.9451 | 193.9124 | 193.9229 | 193.9836 | 193.7097 |
| fT/fw | 10.421 | 10.429 | 10.426 | 10.426 | 10.427 | 10.429 | 10.433 | 10.387 |

Referring to Table 26, it can be seen that the zoom lens system according to the present invention exhibits a high magnification ratio of about 10 times.

As described above, the high magnification zoom lens system according to the present invention provides a zoom lens system having a short focal lens and satisfying both the wide angle and high magnification change with a single lens system. No changing of lenses is necessary and the disadvantages of changing lenses is avoided.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A high magnification zoom lens system including a first lens group having positive refractive power, a second lens group having negative refractive power, a third lens group having positive refractive power, and a fourth lens group having positive refractive power, which are arranged respectively in order from an object side, wherein the third lens group comprises three lens elements respectively having positive, positive, and negative refractive powers in order from the object side, the fourth lens group comprises at least two positive lens elements and a doublet lens and has a positive refractive power as a whole, each lens group moves independently during magnification change, and the high magnification zoom lens system satisfies the following conditions, $$0.40 < \frac{f_W}{f_{bw}} < 0.55 \text{ and}$$

-continued $$0.35 < \frac{\beta_{3,4W}}{\beta_{3,4T}} < 0.43,$$

where $f_w$ is the focal length of the overall lens system at the wide-angle position, $f_{bw}$ is the back focal length of the lens system at the wide-angle position, $\beta_{3,4w}$ is the combined magnification of the third and fourth lens groups at the wide-angle position, and $\beta_{3,4T}$ is the combined magnification ratio of the third and fourth lens groups at the telephoto position.

2. The high magnification zoom lens system of claim 1, wherein the fourth lens group comprises three lens having positive, positive, and negative refractive powers, respectively, in order from the object side, and a positive doublet lens.

3. The high magnification zoom lens system of claim 1, wherein the zoom lens system satisfies the following condition, $$0.15 < \frac{f_W}{f_1} < 0.22,$$

where $f_1$ is the focal length of the first lens group.

4. The high magnification zoom lens system of claim 1, wherein the zoom lens system satisfies the following condition, $$0.28 < \frac{f_W}{f_4} < 0.47,$$

where $f_4$ is the focal length of the fourth lens group.

5. The high magnification zoom lens system of claim 1, wherein each of the second through fourth lens groups has at least one aspherical surface.

6. The high magnification zoom lens system of claim 5, wherein at least one the aspherical surface is formed of a hybrid lens.

7. The high magnification zoom lens system of claim 1, wherein focusing is performed by moving the second lens group when an object located at a short distance is photographed.

8. A high magnification zoom lens system including a first lens group having positive refractive power, a second lens group having negative refractive power, a third lens group having positive refractive power, and a fourth lens group having positive refractive power, which are arranged respectively in order from an object side, wherein the third lens group comprises three lens elements respectively having positive, positive, and negative refractive powers in order from the object side, each lens group moves independently during magnification change, and the high magnification zoom lens system satisfies the following conditions, $$0.40 < \frac{f_W}{f_{bW}} < 0.55,$$

$$0.35 < \frac{\beta_{3,4W}}{\beta_{3,4T}} < 0.43, \text{ and}$$

$$9 < \frac{f_T}{f_W} < 12,$$

where $f_W$ is the focal length of the overall lens system at the wide-angle position, $f_{bW}$ is the back focal length of the lens system at the wide-angle position, $\beta_{3,4W}$ is the combined magnification of the third and fourth lens groups at the wide-angle position, $\beta_{3,4T}$ is the combined magnification of the third and fourth lens groups at the telephoto position, and $f_T$ is the focal length of the overall lens system at the telephoto position.

9. The high magnification zoom lens system of claim 8, wherein the fourth lens group comprises three lens elements having positive, positive, and negative refractive powers, respectively, in order from the object side, and a positive doublet lens.

10. The high magnification zoom lens system of claim 8, wherein the zoom lens system satisfies the following condition, $$0.15 < \frac{f_W}{f_1} < 0.22,$$

where $f_1$ is the focal length of the first lens group.

11. The high magnification zoom lens system of claim 8, wherein the zoom lens system satisfies the following condition, $$0.28 < \frac{f_W}{f_4} < 0.47,$$

where $f_4$ is the focal length of the fourth lens group.

12. The high magnification zoom lens system of claim 8, wherein each of the second through fourth lens groups has at least one aspherical surface.

13. The high magnification zoom lens of claim 12, wherein at least one of the aspherical surfaces is formed of a hybrid lens.

14. The high magnification zoom lens system of claim 8, wherein focusing is performed by moving the second lens group when an object located at a short distance is photographed.

* * * * *